(12) United States Patent
Matsuoka et al.

(10) Patent No.: US 10,982,092 B2
(45) Date of Patent: Apr. 20, 2021

(54) RESIN COMPOSITION AND MOLDED BODY THEREOF

(71) Applicant: Mitsubishi Chemical Corporation, Tokyo (JP)

(72) Inventors: Shinji Matsuoka, Tokyo (JP); Atsushi Kuwahara, Tokyo (JP); Masahiro Ueda, Tokyo (JP)

(73) Assignee: Mitsubishi Chemical Corporation, Tokyo (JP)

( * ) Notice: Subject to any disclaimer, the term of this patent is extended or adjusted under 35 U.S.C. 154(b) by 101 days.

(21) Appl. No.: 16/199,641

(22) Filed: Nov. 26, 2018

(65) Prior Publication Data

US 2019/0092941 A1 Mar. 28, 2019

Related U.S. Application Data

(63) Continuation of application No. PCT/JP2016/065820, filed on May 27, 2016.

(51) Int. Cl.
*C08L 69/00* (2006.01)
*C08K 5/51* (2006.01)
(Continued)

(52) U.S. Cl.
CPC ............ *C08L 69/00* (2013.01); *C08F 279/04* (2013.01); *C08K 3/32* (2013.01); *C08K 5/42* (2013.01);
(Continued)

(58) Field of Classification Search
CPC .................................. C08K 7/14; C08L 69/00
See application file for complete search history.

(56) References Cited

U.S. PATENT DOCUMENTS 3,294,725 A * 12/1966 Findlay .................. D21H 19/32
524/745
5,807,914 A * 9/1998 Obayashi ................. C08K 7/14
428/34.4
(Continued)

FOREIGN PATENT DOCUMENTS

EP       0624621 A2    11/1994
JP     H09-12858 A     1/1997
(Continued)

OTHER PUBLICATIONS

International Search Report issued in related International Patent Application No. PCT/JP2016/065820 dated Aug. 2, 2016.
(Continued)

*Primary Examiner* — Mark S Kaucher
(74) *Attorney, Agent, or Firm* — Morgan, Lewis & Bockius LLP

(57) ABSTRACT

To enhance adhesion between a resin and a glass filler and at the same time to disperse a rubber in the resin to thereby improve mechanical properties of a molded body. Provided is a resin composition containing an engineering plastic (A), a glass filler (B) and a rubber-containing graft polymer (C), wherein a ratio of an acrylonitrile-derived component in a chloroform-soluble component of the resin composition is not more than 2.0 mass %, a content of a fatty acid in 100 parts by mass of the resin composition is not more than 0.03 parts by mass, a total content of calcium and magnesium in 100 parts by mass of a dry sample of the resin composition extracted with chloroform is not more than 0.0008 parts by mass, and a content of aluminum is not more than 0.0008 parts by mass. Also provided is a resin composition further containing a salt (D) of an alkali metal and a strong acid. The engineering plastic (A) is preferably an aromatic polycar-
(Continued)

bonate resin. Also provided is a molded body obtained by molding the resin composition.

32 Claims, 3 Drawing Sheets

(51) Int. Cl.
    *C08L 51/04*     (2006.01)
    *C08K 5/42*     (2006.01)
    *C08L 53/02*     (2006.01)
    *C08L 83/10*     (2006.01)
    *C08K 3/32*     (2006.01)
    *C08L 101/00*     (2006.01)
    *C08L 9/00*     (2006.01)
    *C08F 279/04*     (2006.01)
    *C08K 7/14*     (2006.01)
    *C08K 7/28*     (2006.01)
    *C08K 7/20*     (2006.01)
    *C08K 3/013*     (2018.01)
    *C08F 2/24*     (2006.01)
    *C08F 6/22*     (2006.01)
    *C08K 3/40*     (2006.01)
    *C08L 9/06*     (2006.01)
    *C08L 13/00*     (2006.01)

(52) U.S. Cl.
    CPC .................. *C08K 5/51* (2013.01); *C08L 9/00* (2013.01); *C08L 51/04* (2013.01); *C08L 53/02* (2013.01); *C08L 83/10* (2013.01); *C08L 101/00* (2013.01); *C08F 2/24* (2013.01); *C08F 6/22* (2013.01); *C08K 3/013* (2018.01); *C08K 3/40* (2013.01); *C08K 7/14* (2013.01); *C08K 7/20* (2013.01); *C08K 7/28* (2013.01); *C08L 9/06* (2013.01); *C08L 13/00* (2013.01)

(56) References Cited

U.S. PATENT DOCUMENTS

| | | | |
|---|---|---|---|
| 6,417,319 B1 * | 7/2002 | Shibuya | C08K 5/523 528/196 |
| 2002/0147261 A1 | 10/2002 | Warth et al. | |
| 2014/0114001 A1 | 4/2014 | Choi et al. | |
| 2014/0179856 A1 | 6/2014 | Park et al. | |
| 2015/0353732 A1 * | 12/2015 | Wang | C08L 69/00 524/141 |

FOREIGN PATENT DOCUMENTS

| | | |
|---|---|---|
| JP | 2002-030210 A | 1/2002 |
| JP | 2004-514782 A | 5/2004 |
| JP | 2004-346271 A | 12/2004 |
| JP | 2007-211157 A | 8/2007 |
| JP | 2010-077379 A | 4/2010 |
| JP | 2012-211341 A | 11/2012 |
| JP | 2014-221850 A | 11/2014 |
| JP | 2014-530263 A | 11/2014 |
| JP | 2015-108119 A | 6/2015 |
| JP | 2016-102167 A | 6/2016 |
| KR | 10-2017-0005429 A | 1/2017 |
| WO | 02/45098 A2 | 6/2002 |
| WO | 2004/081114 A1 | 9/2004 |
| WO | 2013/183789 A1 | 12/2013 |
| WO | 2015/189753 A1 | 12/2015 |

OTHER PUBLICATIONS

Office Action issued in counterpart Japanese Patent Application No. 2016-539242 dated Oct. 29, 2019.
Office Action issued in counterpart Korean Patent Application No. 10-2018-7029971 dated Jan. 17, 2020.
Extended European Search Report issued in counterpart European Patent Application No. 16903196.0 dated Apr. 12, 2019.

* cited by examiner

[Fig.1]
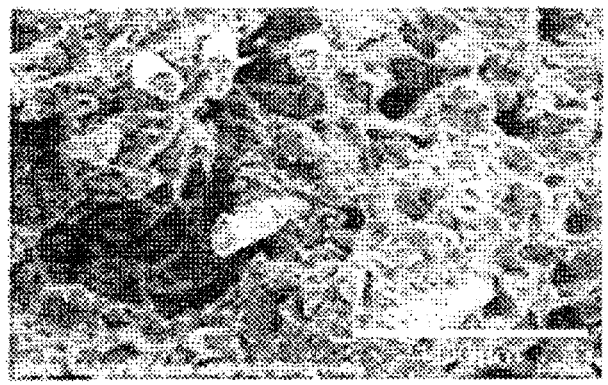
[Fig.2]
[Fig.3]
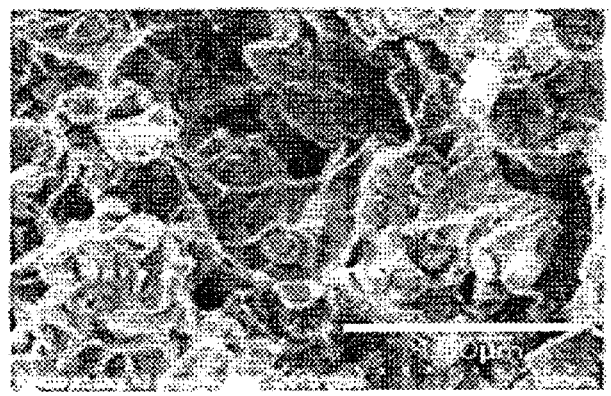

[Fig.4]
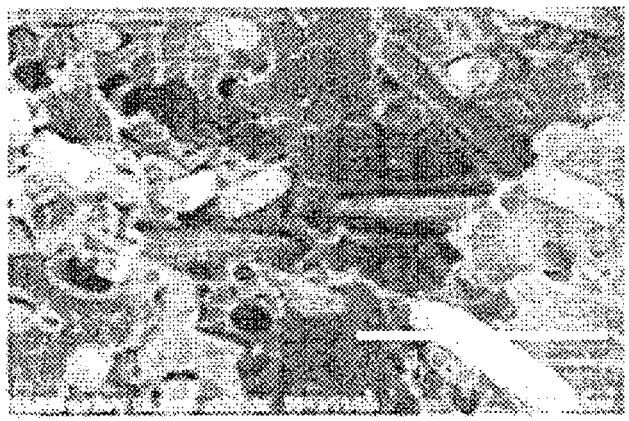
[Fig.5]
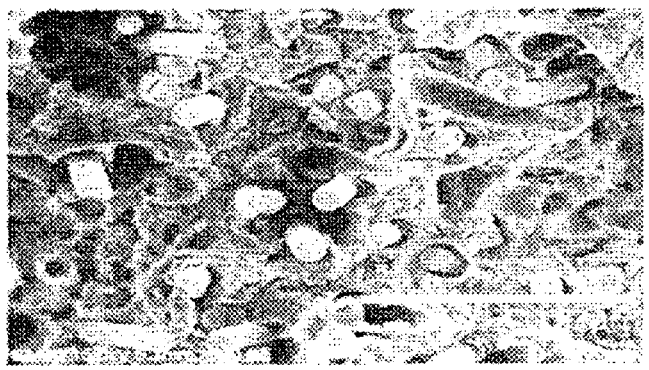
[Fig.6]
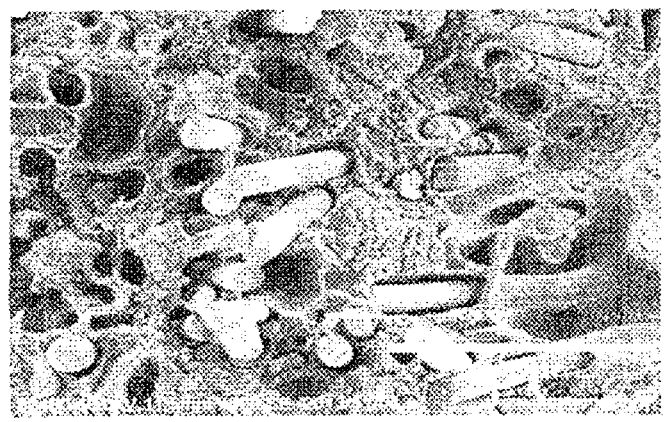

[Fig.7]
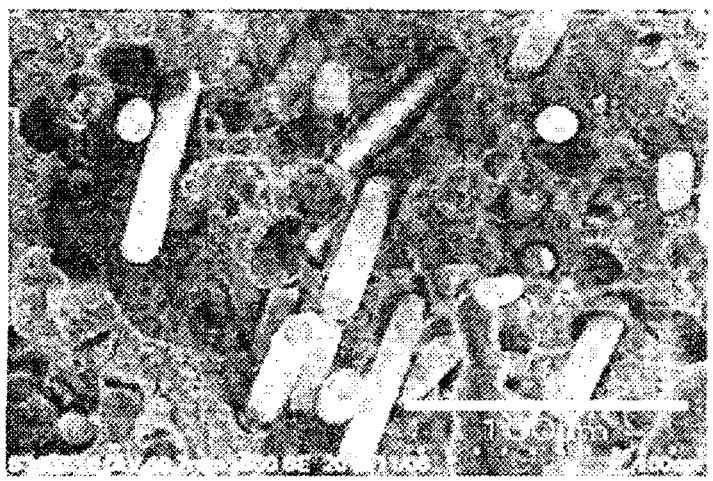

RESIN COMPOSITION AND MOLDED BODY THEREOF

TECHNICAL FIELD

The present invention relates to a resin composition containing an engineering plastic, a glass filler and a rubber-containing graft polymer, and a molded body obtained by molding this resin composition.

BACKGROUND ART

Engineering plastics have been adopted for automotive members and appliance members owing to their excellent heat resistance. In recent years, weight lightening and wall thinning have been highly desired mainly for the automotive members and appliance members, and materials in which glass fillers (glass fibers, etc.) have been compounded with engineering plastics are improved in rigidity such as flexural strength, so that they are preferably used.

These materials exhibit larger improvement effects on rigidity, heat resistance, etc. as the adhesion between the glass filler and the engineering plastic becomes better. However, by compounding the glass filler, impact resistance, particularly notch strength, is decreased. On that account, it is thought that a rubber-containing graft polymer is compounded with these materials for the purpose of improving impact resistance, but if the rubber-containing graft polymer having been heretofore disclosed is compounded, an adverse influence is exerted on the adhesion between the glass filler and the engineering plastic.

Particularly in a field where dimensional stability of a molded body is required, a glass filler has come to be often compounded with an aromatic polycarbonate resin having low water absorption property to cope with the above. However, even if a rubber-containing graft polymer having been heretofore disclosed is compounded with the aromatic polycarbonate resin and the glass filler, the improvement effect on the notch strength is particularly low, and on the other hand, rigidity such as flexural strength decreases.

A rubber-containing graft polymer is generally produced by emulsion polymerization, and is obtained by (process of mixing an acid or calcium-based, magnesium-based or aluminum-based salt with the latex to obtain a coagulated slurry followed by heat treatment, dehydration and drying (hereinafter, referred to as "coagulation method"). For coagulation method of the rubber-containing graft polymer for engineering plastics, a calcium-based, magnesium-based or aluminum-based salt is often used. However, the adhesion between the glass filler and the resin decreases in the presence of salts of calcium or magnesium and strong acids and a salt of aluminum and a strong acid derived from the rubber-containing graft polymer.

A patent literature 1 discloses an example in which a rubber-containing graft polymer (containing more than 1000 ppm of calcium), which is thought to have been obtained by salting out with a calcium-based salt, have been compounded in an amount of about 10 parts by mass with an engineering plastic and a glass filler.

A rubber-containing graft polymer can also be produced by emulsion polymerization using a fatty acid-based alkali metal salt as an emulsifying agent. Therefore, the rubber-containing graft polymer can be coagulated by not salting out but by acid coagulation. Since the fatty acid-based emulsifying agent is changed to a fatty acid by means of an acid and is decreased in hydrophilicity, the rubber-containing graft polymer in a latex is coagulated. The coagulate is subjected to dehydration, washing and drying, and can be recovered as a powder of the rubber-containing graft polymer. A patent literature 2 discloses an example in which a powder of a rubber-containing graft polymer that has been obtained by coagulating, by means of an acid, a latex containing a rubber-containing graft polymer produced by the use of a fatty acid-based emulsifying agent has been compounded with an aromatic polycarbonate resin and a glass filler. However, also the fatty acid acts to decrease adhesion between the glass and the resin.

CITATION LIST

Patent Literature

Patent Literature 1: JP2004-514782A
Patent Literature 2: JP2007-211157A

SUMMARY OF INVENTION

Technical Problem

The present inventors have studied, and as a result, they have found that by producing a rubber-containing graft polymer in such a way that salts of calcium or magnesium and strong acids, a salt of aluminum and a strong acid, and a fatty acid, which decrease adhesion between a glass filler and a resin, are not contained, and by compounding this rubber-containing graft polymer in a resin composition of an engineering plastic and a glass filler, the rubber can be compounded in the resin without decreasing adhesion between the glass filler and the resin, and mechanical strength such as Charpy impact strength can be exhibited without decreasing rigidity of a molded body, particularly flexural strength and elongation at break.

Solution to Problem

The above problems can be solved by any of the following present inventions [1] to [19].

[1] A resin composition containing an engineering plastic (A), a glass filler (B) and a rubber-containing graft polymer (C), wherein a ratio of an acrylonitrile-derived component in a chloroform-soluble component of the resin composition is not more than 2.0 mass %, a content of a fatty acid in 100 parts by mass of the resin composition is not more than 0.03 parts by mass, and in 100 parts by mass of a dry sample, a total content of calcium and magnesium, as measured by the following measuring method X, is not more than 0.0008 parts by mass, and a content of aluminum is not more than 0.0008 parts by mass,
[measuring method X]:
[1] preparation of dry sample:
a solution consisting of 5 mass % of the resin composition and 95 mass % of chloroform is prepared, and the following operations (1) to (4) are carried out to obtain a "dry sample":
(1) the solution is fed to a centrifugal separator and centrifuged at 5000 rpm for 30 minutes,
(2) a supernatant liquid is extracted and placed in a flask,
(3) the flask is set in a thermostatic chamber at a temperature of 68° C., and a volatile component is distilled off from the liquid using an evaporator, and
(4) a residue in the flask is dried at a temperature of 120° C. for 3 hours to obtain a "dry sample", [2] aluminum, magnesium and calcium in the dry sample are determined.

[2] The resin composition according [1], wherein the total content of calcium and magnesium is not more than 0.0006 parts by mass.

[3] A resin composition containing an engineering plastic (A), a glass filler (B) and a rubber-containing graft polymer (C), wherein an acetone-insoluble component content of the rubber-containing graft polymer (C) is not less than 25 mass %, a content of a fatty acid contained in the rubber-containing graft polymer (C) is not more than 1 mass %, and per 100 parts by mass in total of the engineering plastic (A), the glass filler (B) and the rubber-containing graft polymer (C), a total content of salts of calcium or magnesium and strong acids in the resin composition is not more than 0.0008 parts by mass as a total content in terms of calcium and magnesium, and a content of a salt of aluminum and a strong acid is not more than 0.0008 parts by mass as a content in terms of aluminum.

[4] The resin composition according to [3], wherein the total content in terms of calcium and magnesium is not more than 0.0006 parts by mass.

[5] The resin composition according to any one of [1] to [4], further containing a salt (D) of an alkali metal and a strong acid.

[6] The resin composition according to [5], wherein a content of the salt (D) of an alkali metal and a strong acid in 100 parts by mass of the resin composition is 0.01 to 0.5 parts by mass.

[7] The resin composition according to any one of [1] to [6], wherein the rubber-containing graft polymer (C) is one obtained by agglomerating a rubber-containing graft polymer latex by coagulation using a coagulant or spray-drying a latex, the rubber-containing graft polymer latex being obtained by emulsion polymerizing a vinyl monomer in the presence of a rubber latex containing a salt (D) of an alkali metal and a strong acid.

[8] The resin composition according to any one of [1] to [7], wherein the rubber-containing graft polymer (C) is one obtained by spray-drying latex.

[9] The resin composition according to any one of [1] to [8], wherein the resin composition further contains salts of calcium or magnesium and weak acids derived from a component other than the glass filler (B) in a total amount of 0.0010 to 0.0060 parts by mass in terms of calcium and magnesium, per 100 parts by mass in total of the engineering plastic (A), the glass filler (B) and the rubber-containing graft polymer (C).

[10] The resin composition according to any one of [1] to [9], wherein a mass-average particle diameter of a rubber-like polymer in the rubber-containing graft polymer (C) is not more than 300 nm.

[11] The resin composition according to any one of [1] to [10], wherein the engineering plastic (A) is an aromatic polycarbonate resin.

[12] The resin composition according to any one of [5] to [11], wherein the salt (D) of an alkali metal and a strong acid is a salt of sodium or potassium and a sulfonic acid.

[13] The resin composition according to any one of [1] to [12], wherein a content of the rubber-containing graft polymer (C) is 0.25 to 15 mass % in 100 mass % in total of the engineering plastic (A), the glass filler (B) and the rubber-containing graft polymer (C).

[14] The resin composition according to any one of [1] to [12], wherein a content of the rubber-containing graft polymer (C) is 0.25 to 7.5 mass % in 100 mass % in total of the engineering plastic (A), the glass filler (B) and the rubber-containing graft polymer (C).

[15] The resin composition according to any one of [1] to [14], wherein a content of the glass filler (B) is 5 to 40 mass % in 100 mass % in total of the engineering plastic (A), the glass filler (B) and the rubber-containing graft polymer (C).

[16] The resin composition according to any one of [1] to [15], wherein the rubber-containing graft polymer (C) contains one or more rubbers selected from butadiene rubber, styrene-butadiene copolymer rubber and silicone-acrylic composite rubber.

[17] The resin composition according to any one of [1] to [16], wherein the glass filler (B) is a glass fiber.

[18] A molded body obtained by molding the resin composition according to any one of [1] to [17].

[19] A process for producing a resin composition, including mixing an engineering plastic (A), a glass filler (B) and a rubber-containing graft polymer (C) having an acetone-insoluble component content of not less than 25 mass % and a fatty acid content of not more than 1 mass % to produce a resin composition wherein per 100 parts by mass in total of the engineering plastic (A), the glass filler (B) and the rubber-containing graft polymer (C), a total content of salts of calcium or magnesium and strong acids derived from the rubber-containing graft polymer (C) is not more than 0.0008 parts by mass as a total content in terms of calcium and magnesium, and a content of a salt of aluminum and a strong acid derived from the rubber-containing graft polymer (C) is not more than 0.0008 parts by mass as a content in terms of aluminum.

Advantageous Effects of Invention

According to the present invention, adhesion between a resin and a glass filler, which has been heretofore difficult, is enhanced, and at the same time a rubber is dispersed in the resin, whereby mechanical properties of a molded body can be improved.

BRIEF DESCRIPTION OF DRAWINGS

FIG. 1 shows a fracture surface of a molded body of Example 3 after Charpy impact test.

FIG. 2 shows a fracture surface of a molded body of Comparative Example 4 after Charpy impact test.

FIG. 3 shows a fracture surface of a molded body of Example 4 after Charpy impact test.

FIG. 4 shows a fracture surface of a molded body of Comparative Example 1 after Charpy impact test.

FIG. 5 shows a fracture surface of a molded body of Comparative Example 2 after Charpy impact test.

FIG. 6 shows a fracture surface of a molded body of Comparative Example 3 after Charpy impact test.

FIG. 7 shows a fracture surface of a molded body of Comparative Example 5 after Charpy impact test.

DESCRIPTION OF EMBODIMENTS

[Engineering Plastic (A)]

In the resin composition of the present invention, any of various thermoplastic engineering plastics heretofore known can be used as the engineering plastic (A). In the present invention, the "engineering plastic" refers to one having a deflection temperature under load (HDT), as measured by a method in accordance with ISO-75 under a load of 0.45 MPa, of not lower than 100° C. Examples thereof include polyester-based polymers, such as polyphenylene ether, polycarbonate, polyethylene terephthalate and polybutylene terephthalate, syndiotactic polystyrene, nylon-based polymers, such as 6-nylon and 6,6-nylon, polyallylate, polyphenylene sulfide, polyether ketone, polyether ether ketone, polysulfone, polyethersulfone, polyamidoimide, polyetherimide and polyacetal.

Special styrene-based resins having excellent heat resistance and having melt fluidity, such as heat-resistant ABS resin, and resins that are heat-resistant acrylic-based resins and the like and exhibit the aforesaid deflection temperature under load (HDT) can also be given as the examples of the engineering plastics (A) of the present invention. Of these, a polyphenylene ether resin, a polycarbonate resin, etc. are preferable, and an aromatic polycarbonate resin is more preferable, from the viewpoints of heat resistance and thin-wall dimensional stability. These can be used singly or in combinations of two or more.

Examples of the aromatic polycarbonate resins include 4,4'-dioxydiarylalkane-based polycarbonates such as 4,4'-dihydroxydiphenyl-2,2-propane (i.e., bisphenol A)-based polycarbonate.

The molecular weight of the engineering plastic (A) can be appropriately determined according to a request, and is not particularly restricted. However, in the case where the engineering plastic (A) is an aromatic polycarbonate resin, if the viscosity-average molecular weight is 15000 to 30000, fabricability of the resin composition is good, and impact resistance of the resulting molded body is good. A viscosity-average molecular weight of not less than 15000 is preferable because a molded body suffers less cracking when released from a mold in the injection molding of the resin composition, and the resulting molded body exhibits good impact strength. A viscosity-average molecular weight of not more than 30000 is preferable because the resin composition has a melt viscosity enabling molding of the resin composition by usual extrusion or injection molding. The "viscosity-average molecular weight" is calculated in terms of a viscosity obtained by a viscosity method or a gel permeation chromatography (GPC) method.

The engineering plastic (A) can be produced by a known process. For example, when 4,4'-dihydroxydiphenyl-2,2-propane-based polycarbonate is produced, a process in which 4,4'-dihydroxydiphenyl-2,2-propane is used as a raw material and phosgene is blown thereinto in the presence of an alkali aqueous solution and a solvent to perform reaction, or a process in which 4,4'-dihydroxydiphenyl-2,2-propane and carbonic acid diester are subjected to transesterification in the presence of a catalyst can be mentioned.

[Glass Filler (B)]

In the present invention, the glass filler (B) is a substance containing silicate as a main component, and examples thereof include porous particles, such as layered silicate, talc, mica and silica, and glasses (glass fiber, milled glass, glass flake, glass bead, etc.). From the viewpoint of flexural properties of a molded body, a glass fiber is particularly preferable.

[Rubber-Containing Graft Polymer (C)]

The rubber-containing graft polymer (C) to constitute the resin composition of the present invention is one obtained by graft polymerizing a "vinyl-based monomer" onto a "rubber-like polymer". The component derived from graft polymerization to form the rubber-containing graft polymer (C) is referred to as a "graft component" hereinafter.

As the rubber-like polymer, one having a glass transition temperature of not higher than 0° C. can be used. When the glass transition temperature of the rubber-like polymer is not higher than 0° C., impact strength of a molded body obtained from the resin composition of the present invention, as expressed by a value of Charpy impact test, is improved.

Specific examples of the rubber-like polymers include the following ones: butadiene rubber, styrene-butadiene copolymer rubber, silicone rubber, acrylic-based rubbers, such as silicone-acrylic composite rubber (rubber obtained by polymerizing one or more vinyl-based monomers in the presence of a rubber-like polymer obtained from monomers consisting mainly of dimethylsiloxane), acrylonitrile-butadiene copolymer rubber and butyl polyacrylate, polyisoprene, polychloroprene, ethylene/propylene rubber, ethylene-propylene-diene terpolymer rubber, block copolymers, such as styrene/butadiene block copolymer rubber and styrene-isoprene block copolymer rubber, and hydrogenation products thereof. In the cold region, improvement in impact strength of a molded body at lower temperatures (not higher than −20° C.) is desired, and therefore, preferable are butadiene rubber, styrene-butadiene copolymer rubber and silicone-acrylic composite rubber each of which has a glass transition temperature of not higher than −20° C.

The mass-average particle diameter of the rubber-like polymer is preferably not more than 300 nm because impact resistance of a molded body is excellent. The mass-average particle diameter of the rubber-like polymer is preferably not less than 50 nm, more preferably in the range of 70 to 300 nm, and still more preferably in the range of 100 to 300 nm. The mass-average particle diameter of the rubber-like polymer is measured by a capillary particle size distribution meter. As a method to make the mass-average particle diameter be not more than 300 nm, production of a rubber-like polymer by emulsion polymerization is preferable, and by controlling the amount of the emulsifying agent, a rubber-like polymer having a mass-average particle diameter of 50 to 300 nm can be obtained.

Examples of the vinyl-based monomers that are graft polymerized onto the rubber-like polymer include aromatic vinyl compounds, such as styrene and α-methylstyrene; acrylic acid esters, such as methyl acrylate and butyl acrylate; and methacrylic acid esters, such as methyl methacrylate and ethyl methacrylate. These monomers may be used singly or in combinations of two or more. It is preferable to select the vinyl-based monomer in such a way that the glass transition temperature of a polymer or a copolymer obtained by polymerizing the vinyl-based monomer (homopolymerizing or copolymerizing a combination of two or more) becomes not lower than 70° C., from the viewpoint of characteristics (powder fluidity and particle diameter) of a powder obtained by the subsequent coagulation step.

The mass-average particle diameter of a powder of the rubber-containing graft polymer (C) produced as above is preferably 300 to 500 μm. When the particle diameter of this powder is not less than 300 μm, scattering can be suppressed during the compounding or the introduction into a mixing device when the resin composition is prepared, and there is no fear of occurrence of disadvantages such as dust explosion. When the particle diameter of this powder is not more than 500 μm, fluidity characteristics of the powder are good, and there is no fear of occurrence of disadvantages such as clogging of a pipe in the production process.

The glass transition temperature of the polymer formed from the vinyl-based monomer that is graft polymerized onto the rubber-like polymer is more preferably not lower than 80° C., and is still more preferably in the range of 80° C. to 90° C. The glass transition temperatures of, for example, a copolymer of methyl methacrylate and butyl acrylate and a copolymer of styrene and acrylonitrile can be easily set in the range of 80° C. to 90° C., and such copolymers are preferably used.

When the vinyl-based monomer that is graft polymerized is a monomer mixture of styrene and acrylonitrile, the ratio of acrylonitrile to 100 mass % of this monomer mixture is preferably not more than 35 mass % from the viewpoints of polymerizability in the graft polymerization and compatibility of the rubber-containing graft polymer (C) with the engineering plastic (A). This ratio is more preferably in the range of 15 to 30 mass %, still more preferably in the range of 18 to 27 mass %, and particularly preferably in the range of 20 to 26 mass %.

In the vinyl-based monomers subjected to graft polymerization, a "vinyl-based monomer $m_{gp}$" that is actually chemically bonded to the rubber-like polymer, a "vinyl-based monomer $m_{fp}$" that is polymerized without being chemically bonded to the rubber-like polymer and forms a "free polymer $P_{fr}$", and a "vinyl-based monomer $m_{fm}$" that does not undergo polymerization reaction are present. It is preferable that the amount of the vinyl-based monomer $m_{gp}$ that is chemically bonded to the rubber-like polymer among them be large. When the amount of the vinyl-based monomer that is chemically bonded to the rubber-like polymer is large, the rubber-containing graft polymer (C) is easily dispersed in the engineering plastic (A), and interfacial strength between the engineering plastic (A) and the rubber-containing graft polymer (C) is enhanced. It is preferable that the dispersibility of the rubber-containing graft polymer (C) be better and the interfacial strength be stronger because impact strength of a molded body is enhanced. Almost all of the vinyl-based monomers $m_{fm}$ that do not undergo polymerization reaction are removed in the subsequent step for obtaining a powder form (agglomerating step by coagulation or spraying and drying step for the resulting powder).

By the vinyl-based monomer $m_{gp}$, the "graft component" of the rubber-containing graft polymer (C) is formed, and by the vinyl-based monomer $m_{fp}$, the "free polymer $P_{fr}$" (sometimes also referred to as a "non-graft component" hereinafter) is formed, and therefore, in the rubber-containing graft polymer (C) obtained as a powder agglomerate, this "free polymer $P_{fr}$" is mixed. In the present invention, therefore, the rubber-containing graft polymer (C) is a component constituted of 3 components, which are represented by the following formula.

$$WC = W_{rp} + W_{gc} + P_{fr} \quad (1)$$

WC: mass of rubber-containing graft polymer (C)
$W_{rp}$: mass of rubber-like polymer
$W_{gc}$: mass of graft component
$P_{fr}$: free polymer In the rubber-containing graft polymer (C), the ratio of structural units derived from the vinyl-based monomer that is chemically bonded to the rubber-like polymer can be determined as an amount given by subtracting the mass of rubber-like polymer from an acetone-insoluble component content in the rubber-containing graft polymer (C). From such a viewpoint, the acetone-insoluble component content is preferably not less than 25 mass %, more preferably not less than 50 mass %, still more preferably not less than 83 mass %, and particularly preferably not less than 95 mass %.

The acetone-insoluble component content is measured by preparing a solution consisting of 1 mass % of the rubber-containing graft polymer and 99 mass % of acetone and carrying out the following operations (1) to (4).

(1) The solution is fed to a centrifugal separator and centrifuged at 20000 rpm for 30 minutes.
(2) A supernatant liquid is extracted and placed in a flask.
(3) The flask is set in a thermostatic chamber at a temperature of 56° C., and a volatile component is distilled off from the liquid using an evaporator.
(4) A residue in the flask is dried at a temperature of 120° C. for 3 hours to obtain a "dry sample".

The mass of the dry sample (acetone-soluble component) is measured, and the acetone-insoluble component content (mass %) is calculated from the following formula.

$$W_{ais} = (W_{cl} - W_{as})/W_{cl} \times 100 \quad (2)$$

$W_{cl}$: mass of rubber-containing graft polymer subjected to measurement
$W_{as}$: mass % of acetone-soluble component
$W_{ais}$: mass % of acetone-insoluble component In the above operations, the "free polymer $P_{fr}$" is extracted as an acetone-soluble component.

A content ($100W_{rp}/W_c$) of the rubber-like polymer in the rubber-containing graft polymer (C) is preferably in the range of 50 to 95 mass %, more preferably in the range of 70 to 94 mass %, still more preferably in the range of 75 to 93 mass %, particularly preferably in the range of 80 to 92 mass %, and most preferably in the range of 85 to 91 mass %, from the viewpoint of impact strength of a molded body.

The rubber-containing graft polymer (C) can be usually obtained by making the rubber-like polymer be in a latex state in the presence of an emulsifying agent and water, adding the vinyl-based monomer thereto and allowing them to undergo graft polymerization.

Examples of polymerization initiators used in the graft polymerization include peroxides and azo-based initiators.

Examples of the emulsifying agents used in the graft polymerization include alkali metal salts of acids such as fatty acid, sulfonic acid, sulfuric acid and phosphoric acid. From the viewpoint of good adhesion between the engineering plastic and the glass filler, alkali metal salts of strong acids such as sulfonic acid, sulfuric acid and phosphoric acid are preferable as the emulsifying agents. More preferable as the emulsifying agents are alkali metal salts of organic acids containing sulfonic acid, sulfuric acid or phosphoric acid on the grounds that the stability of the latex is excellent and even if they remain in the rubber-containing graft polymer, they do not easily cause heat deterioration of the engineering plastic.

[Salt (D) of Alkali Metal and Strong Acid]

The salt (D) of an alkali metal and a strong acid contained in the resin composition of the present invention may have been incorporated in the rubber-containing graft polymer (C) in advance as an emulsifying agent or the like used in the polymerization for the rubber-containing graft polymer (C), or may be post-added to the resin composition containing the engineering plastic (A), the glass filler (B) and the rubber-containing graft polymer (C).

In the present invention, the "strong acid" refers to an acid having pKa (–log Ka) of not more than 2. The "Ka" is an acid dissociation constant. Examples of the strong acids include hydrogen chloride, sulfuric acid, phosphoric acid, nitric acid and sulfonic acid. In the present invention, the "alkali metals" are elements other than hydrogen among the elements corresponding to Group 1 of the periodic table, and sodium, potassium, etc. correspond to them.

The salt (D) of an alkali metal and a strong acid is preferably an alkali metal salt of sulfonic acid, sulfuric acid or phosphoric acid, and examples thereof include the following ones: potassium persulfate, sodium persulfate; alkali metal salts of perfluoroalkanesulfonic acid, preferably sodium salt or potassium salt of sulfonic acid or the like having a perfluoroalkane group having 1 to 19 carbon atoms, more preferably that having 4 to 8 carbon atoms (e.g., sodium salt or potassium salt of perfluorobutanesulfonic acid, perfluoromethylbutanesulfonic acid or perfluorooctanesulfonic acid); sodium salt or potassium salt of primary phosphoric acid, sodium salt or potassium salt of secondary phosphoric acid, sodium salt or potassium salt of tertiary phosphoric acid; alkali metal salts of organic acids containing sulfonic acid, sulfuric acid or phosphoric acid, more preferably sodium salts or potassium salts of alkylsulfonic acids or alkylarylsulfonic acids; sodium salts or potassium salts of alkylsulfuric acids or alkylarylsulfuric acids; and sodium salts or potassium salts of alkylphosphoric acids or alkylarylphosphoric acids. As the salts (D) of alkali metals and strong acids, alkali metal salts of organic acids containing sulfonic acid, sulfuric acid or phosphoric acid are preferable because the stability of the latex is excellent, and even if they remain in the rubber-containing graft polymer (C), they have less adverse influence on heat deterioration of the engineering plastic (A). More preferable are sodium salts or potassium salts of alkylsulfonic acids or alkylarylsulfonic acids, sodium salts or potassium salts of alkylsulfuric acids or alkylarylsulfuric acids, sodium salts or potassium salts of alkylphosphoric acids or alkylarylphosphoric acids, and mixtures thereof.

Specific examples of the salts (D) of alkali metals and strong acids include the following ones: potassium perfluorobutanesulfonate, potassium diphenylsulfone sulfonate, potassium paratoluenesulfonate, sodium paratoluenesulfonate, sodium dodecylbenzenesulfonate, potassium octylbenzenesulfonate, sodium lauryl sulfate, sodium alkyl naphthyl sulfonate, sodium alkyl diphenyl ether disulfonate, sodium C8-C16 alkylated diphenyl ether disulfonate, potassium hexyl phosphate, sodium dodecyl phosphate, sodium polyoxyethylene alkyl(12-15) ether phosphate, and mixtures thereof. The salts of sodium or potassium and sulfonic acids are preferable because they do not promote hydrolysis such as carbonate linking or ester linking, and more preferable are sodium alkyl sulfonate such as sodium dodecylbenzenesulfonate or sodium alkyl diphenyl ether disulfonate, and potassium sulfonate such as potassium perfluorobutanesulfonate or potassium diphenylsulfone sulfonate. Particularly preferable are sodium alkyl diphenyl ether disulfonate and potassium diphenylsulfone sulfonate because they have good compatibility with the aromatic polycarbonate resin and they do not cause heat deterioration of the resin.

[Fatty Acid]

In the present invention, the "fatty acid" refers to a hydrocarbon compound containing a carboxylic acid. In the case where an alkali metal salt of a fatty acid is used as an emulsifying agent in the graft polymerization, if sulfuric acid, phosphoric acid or the like is added as a strong acid coagulant to a latex of the rubber-containing graft polymer (C) obtained, the alkali metal salt of a fatty acid that is an emulsifying agent changes to a fatty acid having low water solubility. As a result, the rubber-containing graft polymer (C) and water separate from each other, and therefore, the rubber-containing graft polymer (C) can be obtained. In this case, therefore, a fatty acid is contained in the rubber-containing graft polymer (C) produced. Since the fatty acid exerts influence on the adhesion between the glass filler (B) and the engineering plastic (A), the amount of the fatty acid contained in the rubber-containing graft polymer (C) is preferably smaller. The content of the fatty acid in 100 parts by mass of the resin composition of the present invention is preferably not more than 0.03 parts by mass, more preferably not more than 0.02 parts by mass, and still more preferably not more than 0.01 parts by mass. It is most preferable that this content be not more than 0.01 parts by mass and palmitic acid, stearic acid, oleic acid, alkenylsuccinic acid and rosin acid be not detected in the measurement of the fatty acid.

The content of the fatty acid in the rubber-containing graft polymer (C) is preferably not more than 1 mass %, more preferably not more than 0.5 mass %, still more preferably not more than 0.25 mass %, and particularly preferably not more than 0.1 mass %.

A method for detecting the fatty acid is, for example, a method in which a carboxylic acid is subjected to esterification, and the resulting carboxylic acid ester is extracted with an optimum solvent, detected by gas chromatography and determined.

As the polymerization emulsifying agents that are alkali metal salts of fatty acids, many of alkali metal salts of palmitic acid, stearic acid, oleic acid, alkenylsuccinic acid and rosin acid are industrially used. Therefore, in the products of the rubber-containing graft polymer (C) whose production processes are unknown, the amounts of fatty acids can be determined by limiting the fatty acids to palmitic acid, stearic acid, oleic acid, alkenylsuccinic acid and rosin acid. The amounts of palmitic acid, stearic acid, oleic acid alkenylsuccinic acid and rosin acid contained in the rubber-containing graft polymer (C) are preferably as described above (not more than 1 mass %).

In order to make the content of the fatty acid in 100 parts by mass of the resin composition of the present invention be not more than 0.03 parts by mass, it is preferable that the amount of the "emulsifying agent containing a fatty acid" in 100 mass % in total of the rubber-containing graft polymer (C) and the "emulsifying agent containing a fatty acid" (alkali metal salt of fatty acid) be made to be, for example, not more than 0.03 mass % in the stage of charging in the polymerization for the rubber-containing graft polymer (C). Alternatively, it is preferable to use another emulsifying agent instead of the "emulsifying agent containing a fatty acid". Specifically, it is preferable to polymerize the aforesaid rubber-like polymer by polymerization in the presence of a polymerization emulsifying agent that is the salt (D) of an alkali metal and a strong acid and deionized water and then to graft polymerize the vinyl-based monomer because the amount of the fatty acid in the rubber-containing graft polymer (C) is reduced.

[Obtained of Rubber-Containing Graft Polymer (C) in a Powder Form]

The rubber-containing graft polymer (C) in a latex state obtained by the graft polymerization is coagulated, washed and then dried, or agglomerating by spraying a latex, whereby the rubber-containing graft polymer (C) can be obtained as a powder.

The rubber-containing graft polymer (C) is preferably one obtained by agglomerating a rubber-containing graft polymer latex by coagulation using a coagulant, the latex being obtained by emulsion polymerizing a vinyl monomer in the presence of a rubber latex containing the salt (D) of an alkali metal and a strong acid, or one obtained by agglomerating by spraying a latex, and is more preferably one obtained by spraying a latex.

It is preferable to carry out graft polymerization using the salt (D) of an alkali metal and a strong acid as an emulsifying agent and to obtain the rubber-containing graft polymer (C) in a powder form by spraying a latex because the emulsifying agent remains in a state of the salt (D) of an alkali metal and a strong acid in the rubber-containing graft polymer (C).

In the case where graft polymerization is carried out using the salt (D) of an alkali metal and a strong acid as an emulsifying agent and the rubber-containing graft polymer (C) is agglomerated by a coagulation method, it is preferable that a salt containing an alkaline earth metal (Group 2) or an earth metal (Group 13) such as aluminum (calcium chloride, calcium acetate, aluminum sulfate or the like) be used as a coagulant, a large amount of water be used for washing, and moisture in the slurry be sufficiently removed by utilizing a centrifugal separator or the like. The reason why the above coagulant is used is that when an acid is used as a coagulant, it is necessary to use an acid having lower pKa than the "strong acid" of the "salt (D) of an alkali metal and a strong acid", but if such a strong acid remains in the rubber-containing graft polymer (C), the engineering plastic (A) is deteriorated. In the course of the coagulation using the above coagulant, the "salt (D) of an alkali metal and a strong acid" used as an emulsifying agent changes to a "salt of an alkaline earth metal and a strong acid" or a "salt of earth metal (Group 13) and a strong acid". The salt of an alkaline earth metal and a strong acid and the salt of an earth metal (Group 13) and a strong acid have low water solubility, and therefore, the polymer particles in the latex can be agglomerated. As a result, the rubber-containing graft polymer (C) and water separate from each other, and hence, the rubber-containing graft polymer (C) can be obtained in a slurry form. The agglomerated is washed and dried, thereby obtaining a powder of the rubber-containing graft polymer (C). However, the salt of an alkaline earth metal and a strong acid or the salt of an earth metal (Group 13) such as aluminum and a strong acid decreases adhesion between the engineering plastic (A) and the glass filler (B) as compared with the salt (D) of an alkali metal and a strong acid. A salt of calcium and a strong acid, a salt of magnesium and a strong acid, and a salt of aluminum and a strong acid, which are derived from the rubber-containing graft polymer (C), markedly decrease the adhesion between them. On that account, it is preferable to wash the agglomerated polymer particles (slurry) with water or the like.

[Resin Composition]

The resin composition of the present invention is a composition containing the engineering plastic (A), the glass filler (B) and the rubber-containing graft polymer (C). In the following description, the engineering plastic (A) and the rubber-containing graft polymer (C) are sometimes referred to as "resin two components" of the resin composition. The engineering plastic (A), the glass filler (B) and the rubber-containing graft polymer (C) are sometimes referred to as "main three components" of the resin composition.

[Ratio of Acrylonitrile-Derived Component]

The ratio of the acrylonitrile-derived component in a chloroform-soluble component of the resin composition of the present invention is preferably not more than 2.0 mass %. The "acrylonitrile-derived component" refers to an acrylonitrile constitutional component contained in the "free polymer $P_{fr}$". As already described, in the rubber-containing graft polymer (C) obtained as agglomerate in a powder form, the "free polymer $P_{fr}$" that is a "non-graft component" is mixed. Therefore, in the chloroform-soluble component of the resin composition, the engineering plastic (A) and the "free polymer $P_{fr}$" that is a "non-graft component" are contained.

The acrylonitrile-derived component in the chloroform-soluble component of the resin composition can be determined by preparing a solution consisting of 1 mass % of the resin composition and 99 mass % of chloroform, carrying out the following operations (1) to (4), and calculating the amount of acrylonitrile in the resulting "dry sample".

(1) The solution is fed to a centrifugal separator and centrifuged at 20000 rpm for 30 minutes.
(2) A supernatant liquid is extracted and placed in a flask.
(3) The flask is set in a thermostatic chamber at a temperature of 68° C., and a volatile component is distilled off from the liquid using an evaporator.
(4) A residue in the flask is dried at a temperature of 120° C. for 3 hours to obtain a "dry sample".

As a method for calculating the amount of acrylonitrile in the "dry sample", a method in which detection and determination are carried out by means of gas chromatography is preferable. When a nitrogen-containing compound other than acrylonitrile is not present in the "dray sample", it is also possible to perform elemental analysis and to calculate from the nitrogen content.

The reason why not acetone but chloroform is selected as a solvent is that chloroform has higher solubility for the engineering plastic (A) than acetone. Particularly when the engineering plastic (A) is an aromatic polycarbonate resin, chloroform is optimum. From the viewpoint of enhancement in impact strength of a molded body, the amount of the acrylonitrile-derived component in the chloroform-soluble component of the resin composition is more preferably not more than 1.5 mass %, still more preferably not more than 0.8 mass %, and particularly preferably not more than 0.5 mass %.

The vinyl-based monomer that is graft polymerized onto the rubber-like polymer is preferably a copolymer of methyl methacrylate and butyl acrylate or a copolymer of styrene and acrylonitrile (ratio of acrylonitrile units is not more than 35 mass %). In addition, the content of the rubber-like polymer in the rubber-containing graft polymer (C) is preferably in the range of 50 mass % to 95 mass %, and since the amount of the graft component chemically bonded to the rubber-like polymer is preferably larger, the acetone-insoluble component content is more preferably not less than 83 mass %. In the case where the ratio of the acrylonitrile units in the graft polymer is not more than 35 mass % and the acetone-insoluble component content is not less than 83 mass %, the amount of the acrylonitrile-derived component in the chloroform-soluble component can be made to be not more than 2.0 mass % in the resin composition in which per 100 mass % in total of the "main three components", the content of the glass filler (B) is 5 to 40 mass % and the content of the rubber-containing graft polymer (C) is 0.25 to 15 mass %.

In the resin composition of the present invention, the content of the engineering plastic (A) is preferably 95 to 60 mass % in 100 mass % in total of the "main three components". The content thereof is more preferably 80 to 60 mass %, and still more preferably 80 to 70 mass %. When the content thereof is not less than 60 mass %, the resin composition has ease of molding processing, and when it is not more than 95 mass %, a molded body of the resin composition has sufficient flexural properties (strength, elastic modulus).

In the resin composition of the present invention, the content of the glass filler (B) is preferably 5 to 40 mass % in 100 mass % in total of the "main three components". The content thereof is more preferably 10 to 40 mass %, and still more preferably 20 to 30 mass %. When the content thereof is not less than 5 mass %, a molded body of the resin composition can have sufficient flexural properties (strength, elastic modulus), and when it is not more than 40 mass %, a molded body of the resin composition has a sufficient balance between the Charpy impact strength and the flexural properties.

In the resin composition of the present invention, the content of the rubber-containing graft polymer (C) is preferably 0.25 to 15 mass % in 100 mass % in total of the "main three components". The content thereof is more preferably 0.25 to 7.5 mass %, and still more preferably 1 to 3 mass %. When the content thereof is not less than 0.25 mass %, a molded body of the resin composition exhibits an impact strength improving effect. When the content thereof is not more than 15 mass %, the molded body does not suffer marked decrease in flexural properties (strength, elastic modulus) and can be improved in impact strength.

In the resin composition of the first embodiment of the present invention, it is preferable that the content of the fatty acid in 100 parts by mass of the resin composition be not more than 0.03 parts by mass because adhesion between the engineering plastic (A) and the glass filler (B) is good. It is more preferable that palmitic acid, stearic acid, oleic acid, alkenylsuccinic acid and rosin acid be not detected (not more than 0.01 parts by mass).

It is preferable that the resin composition of the present invention further contain the salt (D) of an alkali metal and a strong acid because adhesion between the engineering plastic (A) and the glass filler (B) is excellent. The content of the salt (D) of an alkali metal and a strong acid in 100 parts by mass of the resin composition of the present invention is preferably 0.01 to 0.5 parts by mass. The content thereof is more preferably not more than 0.2 parts by mass, and still more preferably 0.02 to 0.15 parts by mass. A content of not less than 0.01 parts by mass is preferable because adhesion between the engineering plastic (A) and the glass filler (B) is excellent. A content of not more than 0.5 parts by mass is preferable because heat deterioration of the resin composition during the molding or hydrolysis resistance (hydrothermal stability) of the molded body does not become a problem.

The salt (D) of an alkali metal and a strong acid may have been incorporated in the rubber-containing graft polymer (C) in advance as an emulsifying agent or the like used in the graft polymerization for the rubber-containing graft polymer (C), or may be post-added to the resin composition containing the engineering plastic (A), the glass filler (B) and the rubber-containing graft polymer (C).

[Calcium, Magnesium]

The salt of calcium or magnesium and a strong acid in the resin composition decreases adhesion between the engineering plastic (A) and the glass filler (B), accelerates heat deterioration of the resin composition during the molding, and markedly deteriorates properties of a molded body, such as hydrolysis resistance at a high temperature and high humidity. In particular, the salt of calcium or magnesium and a strong acid derived from the rubber-containing graft polymer (C) markedly deteriorates adhesion between the engineering plastic (A) and the glass filler (B).

In the resin composition of the first embodiment of the present invention, the total content of calcium and magnesium in 100 parts by mass of a dry sample, as measured by the following measuring method X, is not more than 0.0008 parts by mass (not more than 8 ppm). When the value of the total content in terms of calcium and magnesium is in this range, adhesion between the engineering plastic (A) and the glass filler (B), heat deterioration of the resin composition during the molding or hydrolyzability of the molded body does not become a problem, and therefore, impact resistance and flexural properties (elastic modulus and strength) of the molded body are excellent. The total content in terms of calcium and magnesium is more preferably not more than 0.0006 parts by mass (not more than 6 ppm), and still more preferably not more than 0.0002 parts by mass (not more than 2 ppm).

[Measuring Method X]

A solution consisting of 5 mass % of the resin composition and 95 mass % of chloroform is prepared, and the following operations (1) to (4) are carried out to obtain a "dry sample". Subsequently, the masses of calcium, magnesium and aluminum in 100 parts by mass of the dry sample are measured.

(1) The solution is fed to a centrifugal separator and centrifuged at 5000 rpm for 30 minutes.
(2) A supernatant liquid is extracted and placed in a flask.
(3) The flask is set in a thermostatic chamber at a temperature of 68° C., and a volatile component is distilled off from the liquid using an evaporator.
(4) A residue in the flask is dried at a temperature of 120° C. for 3 hours to obtain a "dry sample".

The previously mentioned resin composition that is soluble in chloroform is the same as the "dry sample" obtained in (4) of the measuring method X. By measuring the amount of calcium and the amount of magnesium in the "dry sample", it is possible to roughly determine the total content "$W_{cas+mgs}$" of salts of calcium or magnesium and strong acids in the resin composition of the present invention as a total content "$W_{ca+mg}$" in terms of calcium and magnesium. The reason is that a salt of calcium or magnesium and a weak acid, particularly, a salt of calcium or magnesium and a fatty acid, does not easily dissolve in chloroform, and the glass filler (B) does not easily dissolve in chloroform. By measuring the amounts of calcium and magnesium in the chloroform-soluble component in the resin composition, it becomes possible to roughly measure the amounts of calcium and magnesium derived from the salts of calcium or magnesium and strong acids derived from the rubber-containing graft polymer (C). The glass filler (B) sometimes contains calcium or magnesium (salt of calcium or magnesium and silicic acid), but the glass filler (B) does not easily dissolve in chloroform, and therefore, in the chloroform-soluble component in the resin composition, calcium or magnesium derived from the glass filler (B) is not substantially contained.

In the engineering plastic (A) and the glass filler (B), a salt of calcium or magnesium and a strong acid is not basically contained. The glass filler (B) sometimes contains calcium or magnesium, and silicon dioxide taking an amorphous structure contains magnesium or calcium as an ion in its skeleton. Since silicic acid is not a strong acid, a salt of calcium or magnesium and a strong acid is not basically contained in the glass filler (B).

The "$W_{cas+mgs}$" and "$W_{ca+mg}$" are calculated from the following formulas.

$$W_{ca+mg} = W_{ca} + W_{mg} \quad (3)$$

$$W_{cas+mgs} = W_{cas} + W_{mgs} \quad (4)$$

$W_{cas}$: content of salt of calcium and strong acid
$W_{mgs}$: content of salt of magnesium and strong acid
$W_{ca}$: content of calcium
$W_{mg}$: content of magnesium It is preferable to carry out the measuring method X using, as a measurement sample, a resin composition consisting of only two components of an engineering plastic (A) not containing calcium, magnesium and aluminum and a glass filler (B) containing calcium, magnesium and aluminum and to confirm that the "extraction of supernatant liquid" of the aforesaid (2) is performed in such a way that calcium and magnesium derived from the glass filler (B) are not extracted into a chloroform-soluble component in the resin composition and are not detected. As a result of the measurement, a case where the total content of calcium and magnesium is not less than 0.0006 parts by mass (not less than 6 ppm) and/or the content of aluminum is not less than 0.0006 parts by mass (not less than 6 ppm) in 100 parts by mass of the "dry sample" means that the extraction method of the supernatant liquid is not appropriate. In that case, it is preferable to filter the supernatant liquid using a filter having openings each of which is smaller than the diameter of the glass filler (B) but larger than the primary particle diameter of the polymer particles of the rubber-containing graft polymer (C) (filter having opening diameter of 1 μm to 5 μm and having resistance to dissolving in chloroform) when the supernatant liquid is extracted.

If the total content of calcium and magnesium in 100 parts by mass of the "dry sample" is not more than 0.0008 parts by mass (not more than 8 ppm), impact strength and flexural properties (elastic modulus, strength) of the molded body are excellent. The total content of calcium and magnesium is more preferably not more than 0.0006 parts by mass (not more than 6 ppm), and still more preferably not more than 0.0002 parts by mass (not more than 2 ppm). When the total content of calcium and magnesium in 100 parts by mass of the "dry sample" is not more than 0.0008 parts by mass (not more than 8 ppm), the total content of salts of calcium or magnesium and strong acids in 100 parts by mass of the resin composition of the present invention is less than 0.0008 parts by mass (less than 8 ppm) as a total content in terms of calcium and magnesium.

In order to reduce the total content of calcium and magnesium in 100 parts by mass of the dry sample, as measured by the measuring method X, or the total content of salts of calcium or magnesium and strong acids derived from the rubber-containing graft polymer (C), it is preferable to be obtained the rubber-containing graft polymer (C) by spraying. When the rubber-containing graft polymer (C) is obtained in a slurry form by coagulation, it is preferable that a salt containing an alkaline earth metal (Group 2) or an earth metal (Group 13) such as aluminum (calcium chloride, calcium acetate, magnesium sulfate, magnesium chloride, aluminum sulfate or the like) be used as a coagulant, a large amount of water be used for washing, and moisture in the slurry be sufficiently removed by utilizing a centrifugal separator or the like.

[Salt of Calcium or Magnesium and Strong Acid]

In the resin composition of the second embodiment of the present invention, the total content of salts of calcium or magnesium and "strong acids" in the resin composition per 100 parts by mass in total of the "main three components" of the resin composition of the present invention is not more than 0.0008 parts by mass as a total content "$T_{ca+mg}$" in terms of calcium and magnesium. The value of this $T_{ca+mg}$ is calculated from the following formula by calculating each of the total content of salts of calcium or magnesium and strong acids derived from the rubber-containing graft polymer (C) as a total content "$C_{ca+mg}$" in terms of calcium and magnesium, and the total content of salts of calcium or magnesium and strong acids derived from a component other than the rubber-containing graft polymer (C) as a total content "$NC_{ca+mg}$" in terms of calcium and magnesium.

$$T_{ca+mg}=C_{ca+mg}+NC_{ca+mg} \tag{5}$$

The above $C_{ca+mg}$ is calculated from the following formula.

$$C_{ca+mg}=Mc \times (cq_{cas} \times r_{ca} + cq_{mgs} \times r_{mg}) \tag{6}$$

Mc: parts by mass of rubber-containing graft polymer (C) in 100 parts by mass of "main three components" of resin composition
$cq_{cas}$: concentration of salt of calcium and strong acid in rubber-containing graft polymer (C)
$cq_{mgs}$: concentration of salt of magnesium and strong acid in rubber-containing graft polymer (C)
$r_{ca}$: calcium concentration in salt of calcium and strong acid
$r_{mg}$: magnesium concentration in salt of magnesium and strong acid The above $NC_{ca+mg}$ is calculated from the following formula.

$$NC_{ca+mg}=(mnc_{cas} \times r_{ca})+(mnc_{mgs} \times r_{mg}) \tag{7}$$

$mnc_{cas}$: parts by mass of salt of calcium and strong acid derived from component other than rubber-containing graft polymer (C) in resin composition per 100 parts by mass in total of "main three components" of resin composition
$mnc_{mgs}$: parts by mass of salt of magnesium and strong acid derived from component other than rubber-containing graft polymer (C) in resin composition per 100 parts by mass in total of "main three components" of resin composition
$r_{ca}$: calcium concentration in salt of calcium and strong acid
$r_{mg}$: magnesium concentration in salt of magnesium and strong acid When the conversion content $T_{ca+mg}$ is not more than 0.0008 parts by mass (not more than 8 ppm), adhesion between the engineering plastic (A) and the glass filler (B), heat deterioration of the resin composition during the molding, or hydrolyzability of the molded body does not become a problem, and therefore, impact resistance and flexural properties (elastic modulus and strength) of the molded body are excellent. This $T_{ca+mg}$ value is more preferably not more than 0.0006 parts by mass, and still more preferably not more than 0.0002 parts by mass.

[Salt of Calcium or Magnesium and Weak Acid]

In the resin compositions of the first embodiment and the second embodiment of the present invention, the total content of salts of calcium or magnesium and "weak acids" derived from a component other than the glass filler (B) per 100 parts by mass in total of the "main three components" of the resin composition in terms of calcium and magnesium ("$NB'_{ca+mg}$") is preferably 0.0010 to 0.0060 parts by mass. When the value of this content $NB'_{ca+mg}$ is 0.0010 to 0.0060 parts by mass, the molded body is excellent in impact strength and flexural properties (elastic modulus, strength). The value of this content $NB'_{ca+mg}$ is more preferably 0.0020 to 0.0030 parts by mass.

In the present invention, the "weak acid" refers to an acid having pKa (–log Ka) of not less than 3. Examples thereof include fatty acids. Examples of salts of calcium or magnesium and weak acids include calcium palmitate, magnesium palmitate, calcium stearate, magnesium stearate, calcium oleate, magnesium oleate, calcium alkenylsuccinate, magnesium alkenylsuccinate, calcium rosinate and magnesium rosinate, and preferable are calcium stearate, magnesium stearate and the like. As the glass filler (B), silicon dioxide taking an amorphous structure sometimes contains calcium, magnesium and/or aluminum as an ion in the backbone, but silicic acid has pKa of not less than 3 and corresponds to a weak acid in the present invention.

By calculating each of the total content of salts of calcium or magnesium and weak acids in the rubber-containing graft polymer (C) as a total content $C'_{ca+mg}$ in terms of calcium and magnesium, and the total content of salts of calcium or magnesium and weak acids derived from a component other than the glass filler (B) and the rubber-containing graft polymer (C) as a total content $NBC'_{ca+mg}$ in terms of calcium and magnesium, the value of the above total content $NB'_{ca+mg}$ is calculated from the following formula.

$$NB'_{ca+mg} = C'_{ca+mg} + NBC'_{ca+mg} \quad (8)$$

The above $C'_{ca+mg}$ is calculated from the following formula.

$$C'_{ca+mg} = Mc \times (cq'_{cas} \times r'_{ca} + cq'_{mgs} \times r'_{mg}) \quad (9)$$

Mc: parts by mass of rubber-containing graft polymer (C) in 100 parts by mass of "main three components" of resin composition
$cq'_{cas}$: concentration of salt of calcium and weak acid in rubber-containing graft polymer (C)
$cq'_{mgs}$: concentration of salt of magnesium and weak acid in rubber-containing graft polymer (C)
$r'_{ca}$: calcium concentration in salt of calcium and weak acid
$r'_{mg}$: magnesium concentration in salt of magnesium and weak acid The above $NBC'_{ca+mg}$ is calculated from the following formula.

$$NBC'_{ca+mg} = (mnbc'_{cas} \times r'_{ca}) + (mnbc'_{mgs} \times r'_{mg}) \quad (10)$$

$mnbc'_{cas}$: parts by mass of salt of calcium and weak acid derived from a component other than glass filler (B) and rubber-containing graft polymer (C) in resin composition per 100 parts by mass in total of "main three components" of resin composition
$mnbc'_{mgs}$: parts by mass of salt of magnesium and weak acid derived from a component other than glass filler (B) and rubber-containing graft polymer (C) in resin composition per 100 parts by mass in total of "main three components" of resin composition
$r'_{ca}$: calcium concentration in salt of calcium and weak acid
$r'_{mg}$: magnesium concentration in salt of magnesium and weak acid The salts of calcium and magnesium and weak acids in the rubber-containing graft polymer can be obtained by using a salt of a fatty acid and an alkali metal as an emulsifying agent and using a salt containing an alkaline earth metal (Group 2) (calcium chloride, calcium acetate, magnesium sulfate, magnesium chloride or the like) when the rubber-containing graft polymer is produced. In the course of coagulation using, as the coagulant, a coagulant containing the alkaline earth metal (Group 2), the "salt of an alkali metal and a weak acid" used as an emulsifying agent changes to a "salt of an alkaline earth metal and a weak acid". Since the salt of an alkaline earth metal and a weak acid has low water solubility, the polymer particles in the latex can be agglomerated. As a result, the rubber-containing graft polymer (C) and water separate from each other, and therefore, the rubber-containing graft polymer (C) can be obtained in a slurry form. By washing and drying the slurry, a powder of the rubber-containing graft polymer (C) is obtained. The content of the salts of calcium and magnesium and weak acids can be controlled by the amount of the fatty acid-based emulsifying agent compounded, the amount of wash water, etc. The content of the salts of calcium and magnesium and weak acids other than those derived from the glass filler (B) and the rubber-containing graft polymer (C) can be controlled also by post-added the salt of calcium or magnesium and a weak acid during compounding of the resin composition.

[Aluminum]

The salt of aluminum and a strong acid in the resin composition decreases adhesion between the engineering plastic (A) and the glass filler (B), accelerates heat deterioration of the resin composition during the molding, and deteriorates hydrolysis resistance of the molded body at a high temperature and high humidity. In particular, the salt of aluminum and a strong acid derived from the rubber-containing graft polymer (C) markedly deteriorates adhesion between the engineering plastic (A) and the glass filler (B). In the engineering plastic (A) and the glass filler (B), a salt of aluminum and a strong acid is not basically contained. The glass filler (B) sometimes contains aluminum, and silicon dioxide having an amorphous structure contains aluminum as an ion in its skeleton. On that account, a salt of aluminum and a strong acid is not basically contained in the glass filler (B).

[Measuring Method X]

In the resin composition of the first embodiment of the present invention, the aluminum content in 100 parts by mass of a dry sample, as measured by the aforesaid measuring method X, is not more than 0.0008 parts by mass. When this content is not more than 0.0008 parts by mass (8 ppm), decrease in adhesion between the engineering plastic (A) and the glass filler (B), heat deterioration of the resin composition during the molding, or hydrolysis resistance (hydrothermal stability) of the molded body does not become a problem, and therefore, impact resistance and flexural properties (elastic modulus, strength) of the molded body are excellent. The content of aluminum is preferably not more than 0.0006 parts by mass (not more than 6 ppm), and still more preferably not more than 0.0002 parts by mass (not more than 2 ppm). If the value of this content is not more than 0.0006 parts by mass, the adhesion between the engineering plastic (A) and the glass filler (B) becomes more excellent.

By measuring the content of aluminum in the chloroform-soluble component obtained in the "measuring method X", it is possible to roughly determine a salt of aluminum and a strong acid in the "resin two components" of the resin composition, in terms of aluminum. The reason for this is that the salt of aluminum and a weak acid does not easily dissolve in chloroform, and the glass filler (B) does not easily dissolve in chloroform. By measuring the amount of aluminum in the chloroform-soluble component in the resin composition, it becomes possible to roughly measure the amount of aluminum derived from a salt of aluminum and a strong acid. The glass filler (B) sometimes contains aluminum, but in the chloroform-soluble component in the resin composition, aluminum derived from the glass filler (B) is not substantially contained.

If the content of aluminum in 100 parts by mass of the "dry sample" obtained in the measuring method X is not more than 0.0008 parts by mass (not more than 8 ppm), the amount of a salt of aluminum and a strong acid in 100 parts by mass of the resin composition of the present invention becomes less than 0.0008 parts by mass (less than 8 ppm) in terms of aluminum. In order to reduce the content of aluminum in 100 parts by mass of the dry sample, as measured by the measuring method X, and the content of a salt of aluminum and a strong acid derived from the rubber-containing graft polymer (C), it is preferable to obtain the rubber-containing graft polymer (C) by spraying. When the rubber-containing graft polymer (C) is agglomerated in a slurry form by coagulation, it is preferable that a salt containing an alkaline earth metal (Group 2) or an earth metal (Group 13) such as aluminum (calcium chloride, calcium acetate, magnesium sulfate, magnesium chloride, aluminum sulfate or the like) be used as a coagulant, a large amount of water be used for washing, and moisture in the slurry be sufficiently removed by utilizing a centrifugal separator or the like.

[Salt of Aluminum and Strong Acid]

In the resin composition of the second embodiment of the present invention, the total content of salts of aluminum and strong acids in the resin composition per 100 parts by mass in total of the "main three components" of the resin composition is not more than 0.0008 parts by mass as content in terms of aluminum ("$T_{al}$"). By calculating each of the content of a salt of aluminum and a strong acid in the rubber-containing graft polymer (C) as a content in terms of aluminum ($C_{al}$) and the content of a salt of aluminum and a strong acid other than the rubber-containing graft polymer (C) as a content in terms of aluminum ($NC_{al}$), the $T_{al}$ is calculated from the following formula.

$$T_{al}=C_{al}+NC_{al} \quad (11)$$

The above $C_{al}$ is calculated from the following formula.

$$C_{al}=Mc \times cq_{al} \times r_{al} \quad (12)$$

Mc: parts by mass of rubber-containing graft polymer (C) in 100 parts by mass of "main three components" of resin composition $cq_{als}$: concentration of salt of aluminum and strong acid in rubber-containing graft polymer (C)

$r_{al}$: aluminum concentration in salt of aluminum and strong acid

The above $NC_{al}$ is calculated from the following formula.

$$NC_{al}=mnc_{als} \times r_{al} \quad (13)$$

$mnc_{als}$: parts by mass of salt of aluminum and strong acid derived from component other than rubber-containing graft polymer (C) per 100 parts by mass in total of "main three components" of resin composition $r_{al}$: aluminum concentration in salt of aluminum and strong acid If the content $T_{al}$ in terms of aluminum is not more than 0.0008 parts by mass (not more than 8 ppm), adhesion between the engineering plastic (A) and the glass filler (B), heat deterioration of the resin composition during the molding, or hydrolysis resistance (hydrothermal stability) of the molded body does not become a problem, and therefore, impact resistance and flexural properties (elastic modulus and strength) of the molded body are excellent. This content $T_{al}$ in terms of aluminum is more preferably not more than 0.0006 parts by mass (not more than 6 ppm), and still more preferably not more than 0.0002 parts by mass (not more than 2 Ppm).

[Other Additives, Etc.]

The resin composition of the present invention can contain, in addition to the above materials, various known additives, such as stabilizer, flame retardant, flame retarding assistant, hydrolysis inhibitor, antistatic agent, blowing agent, dye and pigment, within limits not detrimental to the object of the present invention.

[Compounding Method]

The method for compounding materials in the preparation of the resin composition of the present invention is a known blending method, and is not particularly limited. For example, a method in which mixing and kneading are carried out using a tumbler, a V-type blender, a super mixer, a Nauta-Mixer, a Banbury mixer, a kneading roll, an extruder or the like can be mentioned. Alternatively, there can be mentioned, for example, a solution blending method in which the engineering plastic (A) and the rubber-containing graft polymer (C) which are each in a state of being dissolved in their common good solvent such as methylene chloride are blended.

[Molded Body]

The resin composition of the present invention can be molded into a molded body of a desired shape by a known molding method. The resin composition can be molded by an extrusion method, an injection molding method, a compression molding method or the like, directly or after once pelletized with a melt extruder. The molded body is not particularly limited, and examples thereof include various members in the automotive field, the appliance field, etc. (TV frames, housings for personal computers, interior members for vehicles (instrument panel and the like), exterior members for vehicles (fender, pillar and the like), etc.).

EXAMPLES

The present invention will be described below in more detail with reference to production examples and examples. Production Examples 1 to 12 are Production examples for rubber-like polymers, rubber-containing graft polymers (C), etc. The "parts" means "parts by mass", and "%" means "mass %".

Production Example 1

By mixing 97.5 parts of octamethylcyclotetrasiloxane, 0.5 part of γ-methacryloyloxypropyldimethoxymethylsilane and 2.0 parts of tetraethoxysilane, 100 parts of a siloxane mixture were obtained. To this, a solution obtained by dissolving 0.67 part of sodium dodecylbenzenesulfonate (DBSNa) in 180 parts of deionized water was added, and they were stirred by a homomixer at 10000 rpm for 5 minutes. Subsequently, the mixture was passed through a homogenizer twice at a pressure of 20 MPa to obtain a siloxane latex.

In a separable flask equipped with a condenser tube, a thermometer and a stirring device, the siloxane latex was introduced, and 0.5 part of dodecylbenzenesulfonic acid was further added as a catalyst to obtain a siloxane latex composition. Subsequently, the siloxane latex composition obtained was maintained in a state of being heated to 80° C. for 8 hours to polymerize organosiloxane. After the polymerization, the latex containing a polymerization product was cooled and neutralized to pH 7.0 by using a 5% sodium hydroxide aqueous solution, thereby obtaining a latex of POSi (S-1). A solid content of the latex of POSi (S-1) was 35.5%, and the mass-average particle diameter of the polymer was 220 nm.

Production Example 2

In a separable flask equipped with a condenser tube, a thermometer, a nitrogen feed pipe and a stirring device, 28.5 parts (10 parts as a charge monomer component) of the latex of POSi (S-1) obtained in Production Example 1 were introduced, then the "component 1" shown in Table 1 was further added, and they were mixed. A nitrogen gas stream was passed through the separable flask to replace the atmosphere in the flask with nitrogen, and the liquid temperature was raised up to 70° C. When the liquid temperature became 70° C., a mixed liquid of the "component 2" shown in Table 1 was added to initiate polymerization. Thereafter, the liquid temperature was maintained at 70° C. for 10 minutes.

Further, a mixed liquid of the "component 3" shown in Table 1 was emulsified by mechanical agitation, and was dropwise added to the separable flask over a period of 150 minutes. Thereafter, the liquid was held for 60 minutes, then a mixed liquid of the "component 4" shown in Table 1 was added, further a mixed liquid of the "component 5" shown in Table 1 was dropwise added to the separable flask over a period of 60 minutes, and the liquid was held for 90 minutes. Thus, a latex of a silicone-based polymer-containing vinyl polymer was obtained. Using an atomizer type spray dryer (manufactured by Ohkawara Kakohki Co., Ltd., trade name: L-8 type spray dryer), the resulting latex was spray dried at a drying heated gas inlet temperature of 140° C. and a drying heated gas outlet temperature of 65° C., thereby obtaining a powder of a rubber-containing graft polymer (Csa-1).

TABLE 1

| | Material | Parts |
|---|---|---|
| Component 1 | Deionized water | 95 |
| | Butyl acrylate | 26 |
| | Allyl methacrylate | 0.5 |
| Component 2 | 2,2'-Azobis[N-(2-carboxyethyl)-2-methylpropionamidine] hydrate (VA057 manufactured by Wako Pure Chemical Industries, Ltd.) | 0.01 |
| | Deionized water | 1.5 |
| Component 3 | Deionized water | 26 |
| | Butyl acrylate | 52 |
| | Allyl methacrylate | 1.1 |
| | Sodium dodecylbenzenesulfonate (DBSNa) | 1.5 |
| | Dimethyl-2,2'-azobis(2-methylpropionate) (V-601 manufactured by Wako Pure Chemical Industries, Ltd.) | 0.1 |
| Component 4 | 2,2'-Azobis[N-(2-carboxyethyl)-2-methylpropionamidine] hydrate (VA057 manufactured by Wako Pure Chemical Industries, Ltd.) | 0.06 |
| | Deionized water | 1.5 |
| Component 5 | Methyl methacrylate | 10 |
| | Butyl acrylate | 0.4 |

Production Example 3

An aqueous solution in which the "component 1" shown in Table 2 was set at a temperature of 30° C., and into the aqueous solution, the latex obtained in Production Example 2 was introduced, and the liquid temperature was raised to 80° C. to perform salting out. An agglomerated rubber-containing graft polymer was filtrated, immersed in 1500 parts of deionized water, repeatedly subjected to dehydration step twice, and dried overnight at a temperature of 80° C., thereby obtaining a powder of a rubber-containing graft polymer (Csa-2).

TABLE 2

| | Material | Parts |
|---|---|---|
| Component 1 | Deionized water | 500 |
| | Calcium acetate | 6 |

Production Example 4

In a separable flask equipped with a condenser tube, a thermometer, a nitrogen feed pipe and a stirring device, 28.5 parts (10 parts as a charge monomer component) of the latex of POSi (S-1) obtained in Production Example 1 were introduced, then the "component 1" shown in Table 3 was further added, and they were mixed. A nitrogen gas stream was passed through the separable flask to replace the atmosphere in the flask with nitrogen, and the liquid temperature was raised up to 50° C. When the liquid temperature became 50° C., a mixed liquid of the "component 2" shown in Table 3 was added to initiate polymerization. Thereafter, the liquid temperature was maintained at 65° C. for 30 minutes. Further, a mixed liquid of the "component 3" shown in Table 3 was dropwise added to the separable flask over a period of 30 minutes, and the liquid was held for 60 minutes. Thus, a latex was obtained.

An aqueous solution in which the "component 4" shown in Table 3 was set at a temperature of 30° C., and into the aqueous solution, the latex was introduced, and the liquid temperature was raised to 80° C. to perform salting out. An agglomerated rubber-containing graft polymer was filtrated, and dried overnight at a temperature of 80° C., thereby obtaining a powder of a rubber-containing graft polymer (Csa-3).

TABLE 3

| | Material | Parts |
|---|---|---|
| Component 1 | Deionized water | 233 |
| | Butyl acrylate | 78 |
| | Allyl methacrylate | 1.6 |
| | t-Butyl peroxide | 0.3 |
| | Sodium polyoxyethylene lauryl ether sulfate | 0.3 |
| Component 2 | Ferrous sulfate | 0.001 |
| | Ethylenediaminetetraacetic acid disodium salt | 0.003 |
| | Sodium formaldehyde sulfoxylate | 0.3 |
| Component 3 | Methyl methacrylate | 10 |
| | Butyl acrylate | 0.4 |
| | t-Butyl peroxide | 0.05 |
| Component 4 | Deionized water | 500 |
| | Calcium acetate | 5 |

Production Example 5

The "component 1" shown in Table 4 was placed in a reaction container equipped with a stirrer and a reflux condenser tube, then heated and stirred at a temperature of 70° C. for 1.5 hours to perform polymerization. Subsequently, a mixture composed of the "component 2" shown in Table 4 was dropwise added to the reaction container over a period of 1 hour, and thereafter, heating and stirring were continued for 1 hour, thereby obtaining an acid group-containing copolymer latex.

TABLE 4

| | Material | Parts |
|---|---|---|
| Component 1 | Ferrous sulfate | 0.003 |
| | Ethylenediaminetetraacetic acid disodium salt | 0.009 |
| | Sodium formaldehyde sulfoxylate | 0.3 |
| | Butyl acrylate | 25 |
| | Potassium oleate | 2 |
| | Sodium dialkylsulfosuccinate | 4 |
| | Cumene hydroperoxide | 0.1 |
| | Deionized water | 200 |
| Component 2 | Butyl acrylate | 60 |
| | Methacrylic acid | 15 |
| | Cumene hydroperoxide | 0.3 |

Production Example 6

The "component 1" shown in Table 5 was dissolved at a temperature of 80° C. Subsequently, an aqueous solution of the "component 2" shown in Table 5 was introduced into the above solution and emulsified by mechanical agitation, thereby preparing an emulsion of a stabilizer.

TABLE 5

| | Material | Parts |
|---|---|---|
| Component 1 | [Ethylenebis(oxyethylene)] bis[3-(3-tert-butyl-4-hydroxy-5-methylphenyl)propionate] (manufactured by BASF, trade name Irganox 245) | 1.9 |
| | Didodecyl 3,3'-thiodipropionate (manufactured by BASF, trade name Irganox PS-800) | 5.7 |
| | Oleic acid | 0.8 |
| Component 2 | Potassium hydroxide | 0.17 |
| | Deionized water | 8 |

Production Example 7

(1) Production of Latex (R-1) of Rubber-Like Polymer

In an autoclave having a volume of 70 L, the "component 1" shown in Table 6 was placed as a first monomer mixed liquid, then the temperature was raised, and when the liquid temperature became 43° C., a redox-based initiator of the "component 2" shown in Table 6 was added to initiate reaction, and thereafter, the liquid temperature was further raised up to 65° C. After 3 hours from the initiation of polymerization, a polymerization initiator of the "component 3" shown in Table 6 was added, and after one hour, a second monomer mixed liquid of the "component 4", an emulsifying agent aqueous solution of the "component 5" and a polymerization initiator of the "component 6" were continuously dropwise added to the autoclave over a period of 8 hours. The reaction was carried out for 4 hours from the initiation of polymerization, thereby obtaining a latex (R-1) of a rubber-like polymer. The mass-average particle diameter of polymer particles in this latex was 170 nm, and dw/dn=1.2.

TABLE 6

| | Material | Parts |
|---|---|---|
| Component 1 | 1,3-Butadiene | 19 |
| | Styrene | 1 |
| | t-Dodecyl mercaptan | 0.1 |
| | Isopropylbenzene hydroperoxide | 0.3 |
| | Sodium formaldehyde sulfoxylate | 0.2 |
| | Sodium alkyl diphenyl ether disulfonate (SS-L) | 0.1 |
| | Potassium hydroxide | 0.01 |
| | Deionized water | 146 |
| Component 2 | Ferrous sulfate | 0.0005 |
| | Ethylenediaminetetraacetic acid disodium salt | 0.0015 |
| | Deionized water | 4 |
| Component 3 | Isopropylbenzene hydroperoxide | 0.1 |
| Component 4 | 1,3-Butadiene | 76 |
| | Styrene | 4 |
| | t-Dodecyl mercaptan | 0.4 |
| Component 5 | Sodium alkyl diphenyl ether disulfonate (SS-L) | 1.3 |
| | Sodium formaldehyde sulfoxylate | 0.2 |
| | Deionized water | 29 |
| Component 6 | Isopropylbenzene hydroperoxide | 0.6 |

(2) Production of Latex ($R_{gr}$-1) of Rubber-Containing Graft Polymer

In a reaction container equipped with a stirrer and a reflux condenser tube, 219 parts (77.5 parts as a charge monomer component) of the latex (R-1) were placed, and the "component 1" shown in Table 7 was added. Subsequently, the liquid temperature in the reaction container was raised to 55° C., then an aqueous solution composed of the "component 2" shown in Table 7 was added, subsequently a mixture of the "component 3" shown in Table 7 was dropwise added to the reaction container over a period of 60 minutes, and heating and stirring were further continued for 60 minutes. Subsequently, a mixture of the "component 4" shown in Table 7 was dropwise added to the reaction container over a period of 60 minutes, and heating and stirring were further continued for 60 minutes. Thus, a vinyl monomer was graft polymerized onto the rubber-like polymer, thereby obtaining a latex ($R_{gr}$-1) of a rubber-containing graft polymer.

TABLE 7

| | Material | Parts |
|---|---|---|
| — | Diene-based rubbery polymer latex | 219 |
| Component 1 | Sodium alkyl diphenyl ether disulfonate (SS-L) | 0.2 |
| Component 2 | Sodium formaldehyde sulfoxylate | 0.08 |
| | Deionized water | 2 |
| Component 3 | Methyl methacrylate | 10 |
| | Butyl acrylate | 1.25 |
| | t-Butyl hydroperoxide | 0.04 |
| Component 4 | Methyl methacrylate | 10 |
| | Butyl acrylate | 1.25 |
| | t-Butyl hydroperoxide | 0.04 |

Production Example 8

With 243.9 parts of the latex ($R_{gr}$-1) of a rubber-containing graft polymer obtained in Production Example 7, 2.2 parts of the emulsion of a stabilizer of Production Example 6 were compounded, and they were mixed. Subsequently, using an atomizer type spray dryer (manufactured by Ohkawara Kakohki Co., Ltd., trade name: L-8 type spray dryer), the resulting mixture was spray dried at a drying heated gas inlet temperature of 140° C. and a drying heated gas outlet temperature of 65° C., thereby obtaining a powder of a rubber-containing graft polymer (Cba-4).

Production Example 9

With 243.9 parts of the latex ($R_{gr}$-1) of a rubber-containing graft polymer obtained in Production Example 7, 2.2 parts of the emulsion of a stabilizer of Production Example 6 were compounded, and they were mixed. Further, 0.5 part of sodium alkyl diphenyl ether disulfonate (SS-L) was compounded. Subsequently, using an atomizer type spray dryer (manufactured by Ohkawara Kakohki Co., Ltd., trade name: L-8 type spray dryer), the resulting mixture was spray dried at a drying heated gas inlet temperature of 140° C. and a drying heated gas outlet temperature of 65° C., thereby obtaining a powder of a rubber-containing graft polymer (Cba-5).

Production Example 10

(1) Production of Latex (R-2) of Rubber-Like Polymer

To an autoclave equipped with a stirrer, the "component 1" shown in Table 8 was added, and the atmosphere in the autoclave was replaced with nitrogen. Subsequently, the "component 2" shown in Table 8 was added, then the autoclave was sealed, and the liquid temperature was raised to 50° C. Subsequently, an oxidation-reduction catalyst aqueous solution containing the "component 3" shown in Table 8 was added, and thereafter, polymerization was carried out at a temperature of 55° C. for 8 hours, thereby obtaining a latex (R-2) of a rubber-like polymer. The mass-average particle diameter of polymer particles in this latex was 100 nm, and the solid content was 32.1%.

TABLE 8

| | Material | Parts |
|---|---|---|
| Component 1 | t-Dodecyl mercaptan | 0.4 |
| | Potassium tallowate (manufactured by Kao Corporation, KS soap) | 1.2 |
| | Disproportionated potassium rosinate (manufactured by Toho Chemical Industry Co., Ltd., Diprosin K-25) | 1.2 |
| | Diisopropylbenzene hydroperoxide | 0.3 |
| | Deionized water | 220 |
| Component 2 | 1,3-Butadiene | 100 |
| Component 3 | Ferrous sulfate | 0.004 |
| | Dextrose | 0.4 |
| | Sodium pyrophosphate | 0.3 |

(2) Production of Latex ($R_{gr}$-2) of Rubber-Containing Graft Polymer

In a reaction container equipped with a stirrer and a reflux condenser tube, 242 parts of the latex (R-2) were placed, and the liquid temperature was raised to 40° C. Subsequently, the "component 1" shown in Table 9 was added, and stirring was carried out for 30 minutes. Thereafter, an aqueous solution of the "component 2" shown in Table 9 was compounded. The mass-average particle diameter of polymer particles in the resulting latex was 250 nm.

Subsequently, the liquid temperature in the reaction container was raised to 55° C., then an aqueous solution of the "component 3" shown in Table 9 was added, subsequently a mixture of the "component 4" shown in Table 9 was dropwise added over a period of 50 minutes, and heating and stirring were further continued for 60 minutes. Subsequently, a mixture of the "component 5" shown in Table 9 was dropwise added over a period of 60 minutes, and heating and stirring were further continued for 60 minutes. Subsequently, a mixture of the "component 6" shown in Table 9 was dropwise added over a period of 10 minutes, and heating and stirring were further continued for 60 minutes. When 15 minutes had passed from the dropwise addition, an oxidation-reduction catalyst aqueous solution containing the "component 7" shown in Table 9 was added, and the "component 8" shown in Table 9 was added to perform graft polymerization. Thus, a vinyl monomer was graft polymerized onto the rubber-like polymer, thereby obtaining a latex ($R_{gr}$-2) of a rubber-containing graft polymer.

TABLE 9

| | Material | Parts |
|---|---|---|
| — | Butadiene-based rubbery polymer latex (R-2) | 242 |
| Component 1 | Acid group-containing copolymer latex produced in Production Example 5 | 4.8 |
| | Deionized water | 10 |
| Component 2 | Dipotassium alkenylsuccinate | 0.7 |
| | Deionized water | 1.3 |
| Component 3 | Sodium formaldehyde sulfoxylate | 0.06 |
| | Deionized water | 2 |
| Component 4 | Methyl methacrylate | 9 |
| | Butyl acrylate | 1 |
| | t-Butyl hydroperoxide | 0.01 |
| Component 5 | Styrene | 12.5 |
| | t-Butyl hydroperoxide | 0.02 |
| Component 6 | Methyl methacrylate | 2.5 |
| | t-Butyl hydroperoxide | 0.01 |

TABLE 9-continued

| | Material | Parts |
|---|---|---|
| Component 7 | Ferrous sulfate | 0.00001 |
| | Ethylenediaminetetraacetic acid disodium salt | 0.00003 |
| | Sodium formaldehyde sulfoxylate | 0.003 |
| Component 8 | t-Butyl hydroperoxide | 0.004 |

With 285.9 parts of this latex ($R_{gr}$-2), 2.2 parts of the emulsion of a stabilizer of Production Example 6 were compounded, and they were mixed.

The "component 1" shown in Table 10 was compounded to prepare an aqueous solution of a temperature of 35° C. Into this aqueous solution, the aforesaid latex was introduced, and the liquid temperature was raised to 75° C. to perform acid coagulation. Thereafter, a 10% sodium hydroxide aqueous solution was introduced to set pH of the slurry to 3. This slurry was cooled, and an aggromerated rubber-containing graft polymer was filtrated, immersed in 1500 parts of deionized water, repeatedly subjected to dehydration step twice and dried overnight at a temperature of 80° C. Thus, a powder of a rubber-containing graft polymer (Cba-6) was obtained.

TABLE 10

| | Material | Parts |
|---|---|---|
| Component 1 | 10% Sulfuric acid aqueous solution | 18 |
| | Deionized water | 152 |

Production Example 11

A powder of a rubber-containing graft polymer (Csa-7) was obtained in the same manner as in Production Example 4, except that instead of the "component 4" shown in Table 3, the "component 4'" shown in Table 11 was used.

TABLE 11

| | Material | Parts |
|---|---|---|
| Component 4' | Deionized water | 500 |
| | Aluminum sulfate | 6 |

Production Example 12

A powder of a rubber-containing graft polymer (Csa-8) was obtained in the same manner as in Production Example 4, except that instead of the "component 4" shown in Table 3, the "component 4''" shown in Table 12 was used.

TABLE 12

| | Material | Parts |
|---|---|---|
| Component 4" | Deionized water | 500 |
| | Magnesium sulfate | 6 |

<Evaluation Method>

[Measurement 1] Determination of sodium, potassium, aluminum, magnesium and calcium ions in rubber-containing graft polymer Using the rubber-containing graft polymer obtained in each of the production examples as a sample, measurement was carried out by the following method.

[1] Preparation of Test Liquid

Into a decomposition container, 0.25 g of a sample was weighed, then 8 ml of nitric acid was added to the container, and the sample was decomposed by microwaves (wet decomposition). After the sample liquid was cooled, 2 ml of hydrofluoric acid was introduced into the container, and the resulting liquid was treated with microwaves again and diluted to 50 ml with distilled water to prepare a test liquid.

[2] Determination of Each Ion Concentration

Using an ICP emission spectrometer (IRS Interpid II XSP, manufactured by Thermo Co., Ltd.), each amount of sodium, potassium, aluminum, magnesium and calcium ions in this test liquid was determined (unit: ppm). The results are set forth together in Table 13.

[2] Calculation of Acetone-Insoluble Component Content

Since the above "dry sample" was an acetone-soluble component, the acetone-insoluble component content was calculated from "100−(acetone-soluble component content)", and the results are set forth together in Table 13.

[Measurement 4] Determination of amounts of aluminum, magnesium and calcium ions in resin composition ([measuring method X])

[1] Preparation of Dry Sample

Using each of the resin compositions obtained in Example 6, Example 9, Example 12 and Comparative Example 8 as a sample, a solution consisting of 5 mass % of each resin

TABLE 13

| Production Example | Rubber-containing graft polymer (C) | Al [ppm] | Ca [ppm] | Mg [ppm] | Na [ppm] | K [ppm] | Amount of fatty acid [%] | Acetone-insoluble component content [%] |
|---|---|---|---|---|---|---|---|---|
| 2 | (Csa-1) | <8 | <8 | <8 | 1000 | 15 | <0.03 | 96 |
| 3 | (Csa-2) | <8 | 1850 | <8 | 15 | <3 | <0.02 | 96 |
| 4 | (Csa-3) | <8 | 280 | <8 | <1 | <3 | <0.01 | 96 |
| 8 | (Cba-4) | <8 | <8 | <8 | 985 | 10 | <0.00 | 97 |
| 9 | (Cba-5) | <8 | <8 | <8 | 1300 | 11 | <0.01 | 97 |
| 10 | (Cba-6) | <8 | <8 | <8 | 50 | <1 | 1.44 | 97 |
| 11 | (Cba-7) | 140 | <8 | <8 | 9 | <3 | <0.01 | 96 |
| 12 | (Cba-8) | <8 | <8 | 240 | 7 | <2 | <0.01 | 96 |

[Measurement 2] Measurement of Amount of Fatty Acid in Rubber-Containing Graft Polymer Using the rubber-containing graft polymer obtained in each of the production examples as a sample, measurement was carried out by the following method.

[1] Preparation of Sample Liquid

In a container, 0.2 g of the sample and 10 ml of 0.1% trifluoroacetic acid (toluene solution) were placed, and they were stirred at a temperature of 80° C. for 60 minutes to dissolve the sample. Next, 1 g of boron trifluoride methanol was added to this container, and methyl esterification was carried out under the conditions of a temperature of 80° C. and 30 minutes. To this container, 10 ml of distilled water and 10 ml of hexane were added to perform two-layer separation, and a hexane layer was used as a sample liquid.

[2] Measurement of Amount of Fatty Acid

Into a gas chromatograph, 1 µl of the sample liquid was injected, and the amounts of palmitic acid, oleic acid, stearic acid, dipotassium alkenylsuccinate and rosin acid were measured. Each of the measured values was converted to a concentration per mass of the sample. The results are set forth together in Table 13.

[Measurement 3] Measurement of Acetone-Insoluble Component Content in Rubber-Containing Graft Polymer

[1] Preparation of Dry Sample

A solution consisting of 1 mass % of the rubber-containing graft polymer and 99 mass % of acetone was prepared, and the following operations (1) to (4) were carried out to obtain a "dry sample".

(1) The solution is fed to a centrifugal separator and centrifuged at 20000 rpm for 30 minutes.
(2) A supernatant liquid is extracted and placed in a flask.
(3) The flask is set in a thermostatic chamber at a temperature of 56° C., and a volatile component is distilled off using an evaporator.
(4) A residue in the flask is dried at a temperature of 120° C. for 3 hours to obtain a "dry sample", composition and 95 mass % of chloroform was prepared, and the following operations (1) to (4) were carried out to obtain a "dry sample".

(1) The solution is fed to a centrifugal separator and centrifuged at 5000 rpm for 30 minutes.
(2) A supernatant liquid is extracted and placed in a flask.
(3) The flask is set in a thermostatic chamber at a temperature of 68° C., and a volatile component is distilled off from the liquid using an evaporator.
(4) A residue in the flask is dried at a temperature of 120° C. for 3 hours to obtain a "dry sample".

[2] Using the dry sample obtained by the above operations as a sample, aluminum, magnesium and calcium ion concentrations were determined in the same manner as in Measurement 1, and the results are set forth together in Table 16.

[Measurement 5] Measurement of Amount of Fatty Acid in Resin Composition

Using each of the resin compositions obtained in Example 6, Example 9, Example 12 and Comparative Example 8 as a sample, the amounts of fatty acids were measured in the same manner as in "Measurement 2", and the results are set forth together in Table 16.

[Measurement 6] Ratio of Acrylonitrile-Derived Component in Chloroform-Soluble Component of Resin Composition

[1] Preparation of Dry Sample

Using each of the resin compositions obtained in Example 6, Example 9, Example 12 and Comparative Example 8, a solution consisting of 1 mass % of each resin composition and 99 mass % of chloroform was prepared, and the following operations (1) to (4) were carried out to obtain a "dry sample".

(1) The solution is fed to a centrifugal separator and centrifuged at 20000 rpm for 30 minutes.
(2) A supernatant liquid is extracted and placed in a flask.
(3) The flask is set in a thermostatic chamber at a temperature of 68° C., and a volatile component is distilled off from the liquid using an evaporator.

(4) A residue in the flask is dried at a temperature of 120° C. for 3 hours to obtain a "dry sample".

[2] Measurement of Nitrogen Content

The "dry sample" (chloroform-soluble component) obtained was subjected to elemental analysis, and a nitrogen content Wn (mass %) was measured.

[3] Calculation of Ratio of Acrylonitrile-Derived Component

The ratio Wacr (mass %) of an acrylonitrile-derived component was calculated from the following calculation formula.

$$Wacr \text{ (mass \%)} = Wn \text{ (mass \%)} \times 53.06 \div 14.00 \quad (14)$$

Molecular weight of acrylonitrile: 53.06
Molecular weight of nitrogen: 14.00

Examples 1 to 5 and Comparative Examples 1 to 5

1. Production of Resin Composition

The rubber-containing graft copolymer (Csa-1) obtained in Production Example 2, glass fiber-compounded aromatic polycarbonate ("Iupilon GS2030M9001" (trade name), manufactured by Mitsubishi Engineering-Plastics Corporation, compounded with 30 mass % of nominal glass fiber, Mv of aromatic polycarbonate resin: 20000), and aromatic polycarbonate (trade name "Iupilon S3000", manufactured by Mitsubishi Engineering-Plastics Corporation, Mv: 20000) were compounded in composition shown in Table 14 and mixed to obtain a mixture. This mixture was fed to a devolatilizing twin-screw extruder (manufactured by Ikegai Iron Works, Ltd., PCM-30) having been heated to a barrel temperature of 310° C., and kneaded, thereby preparing pellets of a resin composition of Example 1 in which 27 mass % of glass fibers had been compounded.

Pellets of resin compositions of Examples 2 to 5 and Comparative Examples 1 to 5 were prepared in the same manner as above, except that the type and/or the amount of the rubber-containing graft copolymer used, and the amounts of other raw materials compounded were changed to the conditions shown in Table 14. As the salt (D) of an alkali metal and a strong acid, sodium dodecylbenzenesulfonate (DBSNa) was compounded in the resin composition in Comparative Example 3, and potassium perfluorobutanesulfonate (F-114) was compounded in the resin composition in Comparative Example 4.

2. Measurement of Contents of Metal and Fatty Acid

In accordance with the method of "Measurement 4", the content of a salt of aluminum and a strong acid (content $W_{al}$ in terms of aluminum) and the contents of salts of calcium or magnesium and strong acids (content $W_{ca}$ in terms of calcium and content $W_{mg}$ in terms of magnesium) in 100 parts by mass of the resulting each resin composition were calculated, and the results are set forth in Table 14.

In the method of "Measurement 2", a salt of a fatty acid (e.g., calcium stearate) and a fatty acid that does not coordinate a salt (e.g., stearic acid) cannot be strictly distinguished. That is to say, the measured value (Mdet mol) of the fatty acid is a total value of the number of moles Ma of a fatty acid and the number of moles Ms of a fatty acid salt present in the resin composition, and can be represented by the following formula.

$$Mdet = Ma + Ms \quad (15)$$

On that account, when not less than 8 ppm of a metallic ion of calcium ion, magnesium ion or aluminum ion is detected in the rubber-containing graft polymer by the method of "Measurement 1", and when a fatty acid is detected by the method of "Measurement 2", these metallic ions are all regarded to be derived from fatty acid salts, and the number of moles Ma of the fatty acid is calculated from the following formula.

$$Ma = Mdet - Ms \quad (16)$$

In the case of mol %, the following formula is established.

$$Ma \text{ (mol \%)} = Mdet \text{ (mol \%)} - Ms \text{ (mol \%)} \quad (17)$$

The method for calculating the amount (Ma mol) of the actually existing fatty acid from the measured value (Mdet mol) of the fatty acid will be described with reference to the following Calculation Examples 1 and 2.

Calculation Example 1

When 1% of stearic acid is detected and when 100 ppm (0.01%) of aluminum and 200 ppm (0.02%) of calcium are detected, mol % of each component is as follows.
Mol % of stearic acid: 1%÷245 (molecular weight of stearic acid)=0.0040 mol %
Mol % of aluminum: [0.01%÷27 (molecular weight of aluminum)]×3 (valence)=0.0008 mol %
Mol % of calcium: [0.02%÷40 (molecular weight of calcium)]×2 (valence)=0.0010 mol %

Accordingly, the amount Ma (mol %) of the fatty acid is calculated from the following formula.

$$Ma \text{ (mol \%)} = Mdet \text{ (mol \%)} - Ms \text{ (mol \%)} = 0.0040 - 0.0008 - 0.0010 = 0.0023$$

The concentration of the fatty acid per mass is calculated from the following formula. 0.0023×245=0.54%

Calculation Example 2

When 0.5% of stearic acid is detected and when 100 ppm (0.01%) of aluminum and 500 ppm (0.05%) of calcium are detected, mol % of each component is calculated from the following formula.

Mol % of stearic acid: 0.5%÷245 (molecular weight of stearic acid)=0.0020 mol %

Mol % of aluminum: [0.01%÷27 (molecular weight of aluminum)]×3 (valence)=0.0008 mol %

Mol % of calcium: [0.05%÷40 (molecular weight of calcium)]×2 (valence)=0.0025 mol %

Accordingly, the amount Ma (mol %) of the fatty acid is calculated from the following formula, and becomes not more than 0.

$$0.0020 - 0.0008 - 0.0025 = -0.0013$$

In this case, all of aluminum becomes a salt of stearic acid, and a part of calcium becomes a salt of stearic acid. The residual calcium becomes a salt of another acid, and its calcium concentration is calculated from the following formula.

$$0.0013 \div 2 \times 40 = 0.026 \text{ (26 ppm)}$$

When a salt of a strong acid and an alkali metal is compounded as an emulsifying agent or the like in the production of a rubber-containing graft polymer, 26 ppm of calcium is regarded to be derived from a salt of a strong acid.

In the aforesaid Calculation Example 1, when the value (Ms mol) of the fatty acid corresponding to the fatty acid salt is subtracted from the measured value (Mdet mol) of the fatty acid, the metallic ions participating in the formation of a fatty acid salt are assigned in order of aluminum, magnesium and calcium. The reason for this is that the order of high basicity is an order of aluminum, magnesium and calcium, and they form salts together with a fatty acid preferentially in order of high basicity.

In Examples 1 to 5 and Comparative Examples 2 and 4 using the polymers (Csa-1), (Csa-2), (Csa-3), (Cba-4) and (Cba-5), the content of a fatty acid is smaller than 0.03 mass %, and calcium and magnesium detected in the polymers are those of salts of strong acids. The strong acids herein are sulfonic acids such as dodecylbenzenesulfonic acid and alkyl diphenyl ether disulfonic acid.

In Comparative Example 3 using the polymer (Cba-6), the amounts of ions of calcium, magnesium and aluminum are not more than the detection limit (less than 8 ppm), and 1.4 mass % of a fatty acid is contained. In Comparative Example 5 using the polymer (Cba-7), the content of a fatty acid is smaller than 0.03 mass %, and aluminum detected in the polymer was that of a salt of a strong acid. The strong acid herein is sulfonic acid such as dodecylbenzenesulfonic acid.

From the results of the amounts of metals and a fatty acid measured by the method of "Measurement 1" and the method of "Measurement 2", the amount of the fatty acid per 100 parts by mass of the "main three components" of the resin composition of each of the examples and the comparative examples was calculated, and the amounts of the salts of aluminum, calcium or magnesium and strong acids per 100 parts by mass in total of the aromatic polycarbonate resin, the glass filler and the rubber-containing graft polymer were calculated as an amount in terms of aluminum and as a total amount in terms of calcium and magnesium, and the results are set forth in Table 14.

TABLE 14

| | | Ex. 1 | Ex. 2 | Ex. 3 | Ex. 4 | Ex. 5 |
|---|---|---|---|---|---|---|
| Compounding [parts by mass] | Glass fiber-compounded PC1 (glass fiber: 30%) | 90.00 | 90.00 | 90.00 | 90.00 | 90.00 |
| | PC2 | 7.50 | 5.00 | — | 5.00 | 5.00 |
| | Polymer (Csa-1) | 2.50 | 5.00 | 10.00 | — | — |
| | Polymer (Csa-2) | — | — | — | — | — |
| | Polymer (Csa-3) | — | — | — | — | — |
| | Polymer (Cba-4) | — | — | — | 5.00 | — |
| | Polymer (Cba-5) | — | — | — | — | 5.00 |
| | Polymer (Cba-6) | — | — | — | — | — |
| | Polymer (Cba-7) | — | — | — | — | — |
| | DBSNa | — | — | — | — | — |
| | F-114 | — | — | — | — | — |
| Amount in 100 mass % in total of "main three components" [mass %] | (A) PC | 70.50 | 68.00 | 63.00 | 68.00 | 68.00 |
| | (B) Glass fiber | 27.00 | 27.00 | 27.00 | 27.00 | 27.00 |
| | (C) Polymer | 2.50 | 5.00 | 10.00 | 5.00 | 5.00 |
| Amount of component per 100 parts by mass of resin composition [parts by mass] | (D)DBSNa | 0.04 | 0.08 | 0.18 | — | — |
| | (D)SS-L | — | — | — | 0.07 | 0.09 |
| | (D)F-114 | — | — | — | — | — |
| | (D)F-114 | — | — | — | — | — |
| Amount per 100 parts by mass in total of "main three components" [parts by mass] | Fatty acid | <0.03 | <0.03 | <0.03 | <0.00 | <0.01 |
| | Salt of Al and strong acid [amount in terms of Al] | <0.0002 | <0.0002 | <0.0002 | <0.0002 | <0.0002 |
| | Salt of Ca or Mg and strong acid [amount in terms of Ca and Mg] | <0.0002 | <0.0002 | <0.0002 | <0.0002 | <0.0002 |
| Flexural properties | Flexural modulus [GPa] | 4.0 | 4.3 | 4.4 | 4.5 | 4.6 |
| | Flexural strength [MPa] | 142 | 135 | 123 | 139 | 141 |
| | Elongation at break [%] | 3.8 | 4.0 | 4.1 | 4 | 4.1 |
| Charpy impact test | Unnotched [kJ/m²] | 66 | 66 | 61 | 61 | 62 |
| | Notched [kJ/m²] | 13 | 14 | 15 | 13 | 13 |

| | | Comp. Ex. 1 | Comp. Ex. 2 | Comp. Ex. 3 | Comp. Ex. 4 | Comp. Ex. 5 |
|---|---|---|---|---|---|---|
| Compounding [parts by mass] | Glass fiber-compounded PC1 (glass fiber: 30%) | 90.00 | 90.00 | 90.00 | 90.00 | 90.00 |
| | PC2 | 10.00 | — | — | — | — |
| | Polymer (Csa-1) | — | — | — | — | — |
| | Polymer (Csa-2) | — | 10.00 | — | — | — |
| | Polymer (Csa-3) | — | — | — | 10.00 | — |
| | Polymer (Cba-4) | — | — | — | — | — |
| | Polymer (Cba-5) | — | — | — | — | — |
| | Polymer (Cba-6) | — | — | 10.00 | — | — |
| | Polymer (Cba-7) | — | — | — | — | 10.0 |
| | DBSNa | — | — | — | 0.16 | — |
| | F-114 | — | — | 0.10 | — | — |
| Amount in 100 mass % in total of "main three components" [mass %] | (A) PC | 73.00 | 63.00 | 63.00 | 63.00 | 63.00 |
| | (B) Glass fiber | 27.00 | 27.00 | 27.00 | 27.00 | 27.00 |
| | (C) Polymer | 0.00 | 10.00 | 10.00 | 10.00 | 10.00 |
| Amount of component per 100 parts by mass of resin composition [parts by mass] | (D)DBSNa | — | — | — | 0.16 | — |
| | (D)SS-L | — | — | 0.10 | — | — |
| | (D)F-114 | — | — | 0.10 | — | — |
| | (D)F-114 | — | — | — | — | — |
| Amount per 100 parts by mass in total of "main three components" [parts by mass] | Fatty acid | — | <0.02 | 0.14 | <0.01 | <0.01 |
| | Salt of Al and strong acid [amount in terms of Al] | <0.0002 | <0.0002 | <0.0002 | <0.0002 | 0.0014 |
| | Salt of Ca or Mg and strong acid [amount in terms of Ca and Mg] | <0.0002 | 0.0185 | <0.0002 | 0.0028 | <0.0002 |

TABLE 14-continued

| Flexural properties | Flexural modulus [GPa] | 5.1 | 4.5 | 4.5 | 4.5 | 4.2 |
|---|---|---|---|---|---|---|
| | Flexural strength [MPa] | 139 | 113 | 118 | 119 | 112 |
| | Elongation at break [%] | 3.2 | 3.6 | 2.9 | 4.1 | 3.0 |
| Charpy impact test | Unnotched [kJ/m$^2$] | 56 | 48 | 37 | 56 | 35 |
| | Notched [kJ/m$^2$] | 10 | 13 | 9 | 14 | 9 |

Glass fiber-compounded PC1: manufactured by Mitsubishi Engineering-Plastics Corporation, Iupilon GS2030M9001
PC2: manufactured by Mitsubishi Engineering-Plastics Corporation, Iupilon S3000
F-114: potassium perfluorobutanesulfonate
SS-L: sodium alkyl diphenyl ether disulfonate 3. Charpy Impact Test The aforesaid 10 pellets were each independently fed to a Sumitomo injection molding machine SE100DU (manufactured by Sumitomo Heavy Industries, Ltd.), and molded bodies (specimens) of length 80 mm×width 10 mm×thickness 4 mm were obtained at a cylinder temperature of 320° C. and a mold temperature of 90° C. The Charpy impact test was carried out in accordance with ISO-179-1, and each molded body was provided with a notch of TYPE A in accordance with ISO2818 and subjected to the measurement. The measurement results are set forth in Table 14.

4. Flexural Test

The aforesaid 10 pellets were each independently fed to a Sumitomo injection molding machine SE100DU (manufactured by Sumitomo Heavy Industries, Ltd.), and molded bodies (specimens) of length 80 mm×width 10 mm×thickness 4 mm were obtained at a cylinder temperature of 320° C. and a mold temperature of 90° C. Measurement was carried out at a bending rate of 2 mm/min in accordance with ISO-178. The measurement results are set forth in Table 14.

5. Observation of Fracture Surface

A fracture surface of a specimen fractured in the Charpy impact test was subjected to SEM observation, and adhesion between the aromatic polycarbonate resin and the glass fibers was evaluated. In FIG. 1 to FIG. 7, fracture surfaces of the molded bodies obtained in the examples and the comparative examples after the Charpy impact test are collected.

6. Summary 1 of Evaluation Results

Comparative Example 1 is an aromatic polycarbonate resin composition containing 27% of glass fibers (glass filler). Comparative Example 2 is an example in which the content of glass fibers in the resin composition was fixed to 27% and the rubber-containing graft polymer (Csa-2) was compounded. The amount of the salts of calcium or magnesium and strong acids derived from the rubber-containing graft polymer (C) per 100 parts in total of the aromatic polycarbonate resin, the glass fibers and the rubber-containing graft polymer ("main three components" of the resin composition) was 0.0185 part in terms of calcium and magnesium, and it exceeded 0.0008 part. On that account, the adhesion between the glass fibers and the aromatic polycarbonate resin was decreased (FIG. 5). Since the adhesion was decreased, the unnotched Charpy impact strength was not improved; on the contrary, it decreased. In addition, also the flexural property improving effect due to compounding of the glass fibers markedly decreased.

Comparative Example 3 is an example in which the rubber-containing graft polymer (Cba-6) was compounded. The rubber-containing graft polymer (Cba-6) contained 1.4% of a fatty acid. On that account, the adhesion between the glass fibers and the aromatic polycarbonate resin decreased (FIG. 6). Since the adhesion decreased, the Charpy impact strength was not improved; on the contrary, it decreased. In addition, also the flexural property improving effect due to compounding of the glass fibers markedly decreased. In Comparative Example 4, the total content of the salts of calcium and/or magnesium and strong acids derived from the rubber-containing graft polymer (C) per 100 parts of the "main three components" of the resin composition was 0.0028 part as a total content in terms of calcium and magnesium, and it exceeded 0.0008 part. On that account, the adhesion between the glass fibers and the aromatic polycarbonate resin was decreased (FIG. 2). The unnotched Charpy impact strength was not improved, and in addition, also the flexural property improving effect due to compounding of the glass fibers markedly decreased.

Comparative Example 5 is an example in which the rubber-containing graft polymer (Cba-7) was compounded. In the case where 10% of the rubber-containing graft polymer (Cba-7) was compounded in the resin composition, the content of the salt of aluminum and a strong acid derived from the rubber-containing graft polymer (C) per 100 parts of the "main three components" of the resin composition was 0.0014 part as a content in terms of aluminum, and it exceeded 0.0008 part. On that account, the adhesion between the glass fibers and the aromatic polycarbonate resin decreased (FIG. 7). Since the adhesion decreased, the Charpy impact strength was not improved; on the contrary, it decreased. In addition, also the flexural property improving effect due to compounding of the glass fibers markedly decreased.

In Examples 1 to 5, the acetone-insoluble component content of the rubber-containing graft polymer (C) used was not less than 25 mass %, the amount of the fatty acid contained in the rubber-containing graft polymer (C) was not more than 1 mass %, the total content of the salts of calcium or magnesium and strong acids derived from the rubber-containing graft polymer (C) per 100 parts by mass of the "main three components" of the resin composition was not more than 0.0008 part as a total content in terms of calcium and magnesium, and the content of the salt of aluminum and a strong acid was not more than 0.0008 part as a content in terms of aluminum. In both of notched and unnotched molded bodies, impact strength was improved. In the case of the resin composition containing 10 parts by mass of the rubber-containing graft polymer (Example 3), the flexural strength of its molded body was lower than that in the case of the resin composition containing no rubber-containing graft polymer (Comparative Example 1). The flexural strength of each of the molded bodies of the resin compositions (Examples 1, 2, 4, 5) containing 2.5 to 5 parts by mass of the rubber-containing graft polymer was almost equal to the flexural strength of the molded body of the resin composition containing no rubber-containing graft polymer (Comparative Example 1), and in both of notched and unnotched molded bodies, the impact strength was improved. Example 3 and Comparative Examples 2, 4 and 5 were almost the same as one another in polymer constitutional components of the rubber-containing graft polymer and were the same as one another in the amount of the rubber-containing graft polymer compounded, but they differed in the total content of the salts of calcium and magnesium and strong acids derived from the rubber-containing graft polymer (C) as a total content in terms of calcium and magnesium, or the content of the salt of aluminum and a strong acid as a content in terms of aluminum. The larger the total content of the salts of calcium and magnesium and strong acids derived from the rubber-containing graft polymer (C) as a total content in terms of calcium and magnesium or the content of the salt of aluminum and a strong acid as a content in terms of aluminum in the resin composition is, the lower the mechanical strength of the molded body, such as flexural strength or Charpy impact strength, becomes. It can be seen from FIG. 1, FIG. 2, FIG. 5 and FIG. 7 that the resin composition of Example 3 containing the rubber-containing graft polymer was superior to the resin composition of Comparative Example 2, 4 or 5 containing the rubber-containing graft polymer in adhesion between the glass fibers and the aromatic polycarbonate.

Examples 6 to 14 and Comparative Examples 6 to 8

1. Production of Resin Composition

The rubber-containing graft copolymer (Csa-1) obtained in Production Example 2, glass fiber-compounded aromatic polycarbonate ("Iupilon GS2030M9001" (trade name), manufactured by Mitsubishi Engineering-Plastics Corporation, compounded with 30 mass % of nominal glass fiber, Mv of aromatic polycarbonate resin: 20000), and aromatic polycarbonate (trade name "Iupilon S3000", manufactured by Mitsubishi Engineering-Plastics Corporation, Mv: 20000) were compounded in composition shown in Table 15 and mixed. This mixture was fed to a devolatilizing twin-screw extruder (manufactured by Ikegai Iron Works, Ltd., PCM-30) having been heated to a barrel temperature of 280° C., and kneaded, thereby preparing pellets of a resin composition of Example 6 in which 27 mass % of glass fibers had been compounded.

Pellets of resin compositions of Examples 7 to 18 and Comparative Examples 6 to 8 were prepared in the same manner as above, except that the type and/or the amount of the rubber-containing graft copolymer (C) used, and the amounts of other raw materials compounded were changed to the conditions shown in Table 15. In Examples 8 and 11 and Comparative Example 7, potassium diphenylsulfone sulfonate (KSS) was compounded in the resin composition, and in Example 10, potassium perfluorobutanesulfonate (F-114) was compounded in the resin composition.

2. Measurement of Contents of Metal and Fatty Acid

From the amounts of metals and a fatty acid measured by the method of "Measurement 1" and the method of "Measurement 2", the amount of the fatty acid per 100 parts by mass of the "main three components" of the resin composition of each of the examples and the comparative examples, and the amount of the salts of aluminum, calcium and magnesium and strong acids per 100 parts by mass in total of the aromatic polycarbonate resin, the glass filler and the rubber-containing graft polymer as an amount in terms of calcium and magnesium were calculated, and the results are set forth in Table 15. In the rubber-containing graft polymers (Csa-1), (Csa-3) and (Csa-8), a fatty acid or its salt is not contained, and therefore, calcium and magnesium detected in these polymers are those of the salts of strong acids.

In Examples 12 to 14, calcium stearate or magnesium stearate was compounded. The charge values thereof were calculated, and the amounts of the salts of calcium and magnesium and weak acids per 100 parts by mass of the "main three components" of the resin composition were calculated as an amount in terms of calcium and an amount in terms of magnesium.

3. Charpy Impact Test

Charpy impact test was carried out in the same manner as in Example 1, except that the cylinder temperature was changed to 280° C. The measurement results are set forth in Table 15.

4. Flexural Test

Flexural test was carried out in the same manner as in Example 1, except that the cylinder temperature was changed to 280° C. The measurement results are set forth in Table 15.

5. Summary 2 of Evaluation Results

The above evaluation results are summarized as follows.

Examples 6 to 14 and Comparative Examples 6 to 8 are evaluation results of resin compositions obtained by setting the extrusion molding temperature at 280° C. Comparative Example 8 is an aromatic polycarbonate resin composition containing 27 mass % of glass fibers. In Comparative Examples 6 and 7, the total content of the salts of calcium and magnesium and strong acids derived from the rubber-containing graft polymer (C) per 100 parts by mass of the "main three components" of the resin composition exceeded 0.0008 parts by mass, and impact strength of the molded bodies was not sufficient, and in particular, decrease in flexural strength was large.

In Examples 6 to 14, the total content of the salts of calcium and magnesium and strong acids derived from the rubber-containing graft polymer (C) per 100 parts by mass of the "main three components" of the resin composition was not more than 0.0008 parts by mass as a total content in terms of calcium and magnesium, and the molded bodies were excellent in impact strength.

From the comparison between Example 7 and Example 8 and the comparison between Examples 9, Example 10 and Example 11, it was confirmed that the flexural strength of the molded body was improved by compounding the salt (D) of an alkali metal and a strong acid, such as potassium diphenylsulfone sulfonate (KSS). In Example 11, improvement in impact strength was also observed.

Examples 12 to 14 are each a composition obtained by compounding a salt of calcium or magnesium and a weak acid with the resin composition of Example 6 during the extrusion. Their molded bodies were improved more in impact strength and/or flexural properties than the molded body of Example 6 even though the total content of the salts of calcium or magnesium and acids in 100 parts by mass of the "main three components" of the resin composition was not less than 0.0008 parts by mass as a total content in terms of calcium and magnesium. From Examples 12 to 14, it can be seen that when the total content of the salts of calcium or magnesium and weak acids in 100 parts by mass of the "main three components" of the resin composition was in the range of 0.010 to 0.0060 as a total content in terms of calcium and magnesium, flexural properties and unnotched Charpy impact strength of the molded bodies were particularly excellent.

TABLE 15

|  |  | Ex. 6 | Ex. 7 | Ex. 8 | Ex. 9 | Ex. 10 | Ex. 11 | Ex. 12 |
|---|---|---|---|---|---|---|---|---|
| Compounding [parts by mass] | Glass fiber-compounded PC1 (glass fiber: 30%) | 90.00 | 90.00 | 90.00 | 90.00 | 90.00 | 90.00 | 90.00 |
|  | PC2 | 5.00 | 7.50 | 7.50 | 7.70 | 7.70 | 7.70 | 5.00 |
|  | Polymer (Csa-1) | 5.00 | — | — | — | — | — | 5.00 |
|  | Polymer (Csa-3) | — | — | — | 2.25 | 2.25 | 2.25 | — |
|  | Polymer (Cba-8) | — | 2.50 | 2.50 | — | — | — | — |
|  | Ca stearate | — | — | — | — | — | — | 0.02 |
|  | Mg stearate | — | — | — | — | — | — | — |
|  | F-114 | — | — | — | — | 0.10 | — | — |
|  | KSS | — | — | 0.10 | — | — | 0.10 | — |
| Amount in 100 mass % in total of "main three components" [mass %] | (A) PC | 68.00 | 70.50 | 70.50 | 70.70 | 70.70 | 70.70 | 68.00 |
|  | (B) Glass fiber | 27.00 | 27.00 | 27.00 | 27.00 | 27.00 | 27.00 | 27.00 |
|  | (C) Polymer | 5.00 | 2.50 | 2.50 | 2.30 | 2.30 | 2.30 | 5.00 |
| Amount of component per 100 parts by mass of resin composition [parts by mass] | (D)DBSNa | 0.08 | — | — | — | — | — | 0.08 |
|  | (D)F-114 | — | — | — | — | 0.10 | — | — |
|  | (D)KSS | — | — | 0.10 | — | — | 0.10 | — |
| Amount per 100 parts by mass in total of "main three components" [parts by mass] | Fatty acid | <0.03 | <0.01 | <0.01 | <0.01 | <0.01 | <0.01 | <0.03 |
|  | Salt of Al and acid [amount in terms of Al] | <0.0001 | <0.0001 | <0.0001 | <0.0001 | <0.0001 | <0.0001 | <0.0001 |
|  | Salt of Ca or Mg and strong acid [amount in terms of Ca and Mg] | <0.0001 | <0.0001 | <0.0001 | 0.0007 | 0.0007 | 0.0007 | <0.0001 |
|  | Salt of Ca and weak acid [amount in terms of Ca] | <0.0001 | <0.0001 | <0.0001 | <0.0001 | <0.0001 | <0.0001 | 0.0014 |
|  | Salt of Mg and weak acid [amount in terms of Mg] | <0.0002 | 0.0006 | 0.0006 | <0.0001 | <0.0001 | <0.0001 | <00001 |
| Flexural properties | Flexural modulus [GPa] | 4.6 | 4.4 | 4.6 | 4.4 | 4.5 | 4.7 | 4.7 |
|  | Flexural strength [MPa] | 121 | 121 | 129 | 121 | 122 | 128 | 122 |
|  | Elongation at break [%] | 4.1 | 4.0 | 3.9 | 4.0 | 3.9 | 3.9 | 3.9 |
| Charpy impact test | Unnotched [kJ/m$^2$] | 44 | 44 | 43 | 43 | 44 | 48 | 48 |
|  | Notched [kJ/m$^2$] | 13 | 12 | 12 | 11 | 11 | 14 | 13 |

|  |  | Ex. 13 | Ex. 14 | Comp. Ex. 6 | Comp. Ex. 7 | Comp. Ex. 8 |
|---|---|---|---|---|---|---|
| Compounding [parts by mass] | Glass fiber-compounded PC1 (glass fiber: 30%) | 90.00 | 90.00 | 90.00 | 90.00 | 90.00 |
|  | PC2 | 5.00 | 5.00 | 5.00 | 5.00 | 10.00 |
|  | Polymer (Csa-1) | 5.00 | 5.00 | — | — | — |
|  | Polymer (Csa-3) | — | — | — | 5.00 | — |
|  | Polymer (Cba-8) | — | — | 5.00 | — | — |
|  | Ca stearate | 0.04 | — | — | — | — |
|  | Mg stearate | — | 0.03 | — | — | — |
|  | F-114 | — | — | — | — | — |
|  | KSS | — | — | — | — | — |
| Amount in 100 mass % in total of "main three components" [mass %] | (A) PC | 68.00 | 68.00 | 68.00 | 68.00 | 73.00 |
|  | (B) Glass fiber | 27.00 | 27.00 | 27.00 | 27.00 | 27.00 |
|  | (C) Polymer | 5.00 | 5.00 | 5.00 | 5.00 | 0.00 |
| Amount of component per 100 parts by mass of resin composition [parts by mass] | (D)DBSNa | 0.08 | 0.08 | — | — | — |
|  | (D)F-114 | — | — | — | — | — |
|  | (D)KSS | — | — | — | — | — |
| Amount per 100 parts by mass in total of "main three components" [parts by mass] | Fatty acid | <0.03 | <0.03 | <0.01 | <0.01 | — |
|  | Salt of Al and acid [amount in terms of Al] | <0.0001 | <0.0001 | <0.0001 | <0.0001 | <0.0001 |
|  | Salt of Ca or Mg and strong acid [amount in terms of Ca and Mg] | <0.0001 | <0.0001 | <0.0001 | 0.0013 | <0.0001 |
|  | Salt of Ca and weak acid [amount in terms of Ca] | 0.0027 | 0.0014 | <0.0001 | <0.0001 | <0.0001 |
|  | Salt of Mg and weak acid [amount in terms of Mg] | <0.0001 | <0.0001 | 0.0012 | <0.0001 | <0.0001 |
| Flexural properties | Flexural modulus [GPa] | 4.6 | 4.9 | 4.4 | 4.4 | 4.8 |
|  | Flexural strength [MPa] | 136 | 131 | 117 | 116 | 127 |
|  | Elongation at break [%] | 4.5 | 4.1 | 3.7 | 3.8 | 3.6 |
| Charpy impact test | Unnotched [kJ/m$^2$] | 52 | 47 | 40 | 41 | 40 |
|  | Notched [kJ/m$^2$] | 12 | 12 | 11 | 11 | 9 |

Glass fiber-compounded PC1: manufactured by Mitsubishi Engineering-Plastics Corporation, Iupilon GS2030M9001
PC2: manufactured by Mitsubishi Engineering-Plastics Corporation, Iupilon S3000
F-114: potassium perfluorobutanesulfonate
SS-L: sodium alkyl diphenyl ether disulfonate 6. Evaluation by Measurement 4 to Measurement 6

With regard to each of the resin compositions of Example 6, Example 9, Example 12 and Comparative Example 8, the amounts of the components were measured in accordance with the aforesaid Measurement 4, Measurement 5 and Measurement 6, and the evaluation results are set forth together in Table 16.

TABLE 16

|  |  | Ex. 6 | Ex. 9 | Ex. 12 | Comp. Ex. 8 |
|---|---|---|---|---|---|
| Compounding [parts by mass] | Glass fiber-compounded PC1 (glass fiber: 30%) | 90.00 | 90.00 | 90.00 | 90.00 |
|  | PC2 | 5.00 | 7.70 | 5.00 | 10.00 |
|  | Polymer (Csa-1) | 5.00 | — | 5.00 | — |
|  | Polymer (Csa-3) | — | 2.30 | — | — |
|  | Ca stearate | — | — | 0.02 | — |
|  | DBSNa | — | — | — | — |
| Amount in 100 mass % in total of "main three components" [mass %] | (A) PC | 68.00 | 70.70 | 68.00 | 73.00 |
|  | (B) Glass fiber | 27.00 | 27.00 | 27.00 | 27.00 |
|  | (C) Polymer | 5.00 | 2.30 | 5.00 | 0.00 |
| Amount of component per 100 parts by mass of resin composition [parts by mass] | (D)DBSNa | 0.08 | — | 0.08 | — |
| Amount of component in chloroform-soluble component of resin composition [mass %] | Amount of AN component | 0.1%< | 0.1%< | 0.1%< | 0.1%< |
| Amount of component per 100 parts by mass of resin composition [parts by mass] | Amount of fatty acid | <0.01 | <0.01 | <0.01 | <0.01 |
| Amount of metal in 100 parts by mass of dry sample after measuring method X [ppm] | Ca | <2 | 5 | <2 | <2 |
|  | Mg | <2 | <2 | <2 | <2 |
|  | Al | <2 | <2 | <2 | <2 |
| Flexural properties | Flexural modulus [GPa] | 4.6 | 4.4 | 4.7 | 4.8 |
|  | Flexural strength [MPa] | 121 | 121 | 122 | 127 |
|  | Elongation at break [%] | 4.1 | 4.0 | 3.9 | 3.6 |
| Charpy impact test | Unnotched [kJ/m$^2$] | 44 | 43 | 48 | 40 |
|  | Notched [kJ/m$^2$] | 13 | 11 | 13 | 9 |

Glass fiber-compounded PC1: manufactured by Mitsubishi Engineering-Plastics Corporation, lupilon GS2030M9001
PC2: manufactured by Mitsubishi Engineering-Plastics Corporation, lupilon S3000
F-114: potassium perfluorobutanesulfonate
SS-L: sodium alkyl diphenyl ether disulfonate The resin compositions of Example 6, Example 9 and Example 12 satisfied all the requirements for the resin composition of the first embodiment of the present invention, and the resulting molded bodies of the resin compositions were excellent in impact strength.

By measuring the contents of calcium, magnesium and aluminum in the chloroform-soluble component in the resin composition, it becomes possible to roughly measure the contents of calcium and magnesium derived from a salt of a strong acid contained in the resin composition and the content of aluminum derived from a salt of a strong acid contained in the resin composition. The glass filler (B) does not easily dissolve in chloroform, and therefore, in the chloroform-soluble component in the resin composition, metal components contained in the glass filler (B) are hardly contained. In the glass fibers compounded in the resin compositions in the examples and the comparative examples, about 4 mass % of calcium, about 0.2 mass % of magnesium and about 2 mass % of aluminum were contained. The amounts of calcium, magnesium and aluminum in the resin composition of Comparative Example 8 obtained after the "measuring method X" were not more than the detection limit (2 ppm). It could be judged that in 100 parts by mass of the resin composition (dry sample) after the "measuring method X", calcium, magnesium and aluminum derived from the glass fibers were not contained in amounts of not less than 0.0002 parts by mass, and therefore, filtration using a filter was not carried out when a supernatant liquid was extracted.

By measuring the amounts of calcium, magnesium and aluminum in the chloroform-soluble component in the resin composition, it is possible to roughly determine the total content of the salts of calcium or magnesium and strong acids as a total content in terms of calcium and magnesium, and the content of the salt of aluminum and a strong acid as a content in terms of aluminum. The reason is that the salt of calcium or magnesium and a weak acid, particularly a salt of calcium or magnesium and a fatty acid, does not easily dissolve in chloroform.

In the resin composition of Example 12, calcium stearate that was a salt of calcium and a weak acid was compounded in an amount of 0.0020÷(1−0.27)=0.0027 parts by mass (27 ppm) as a content in terms of calcium, per 100 parts by mass of the total (resin two components) of the aromatic polycarbonate resin and the rubber-containing graft polymer. However, as a result of "Determination of amounts of aluminum, magnesium and calcium ions in resin composition" of "Measurement 4", the amount of calcium was not more than the detection limit (not more than 2 ppm, not more than 0.0002 parts by mass per 100 parts by mass of the resin two components). This indicates that calcium stearate that was a salt of calcium and a weak acid was removed by the measuring method X.

INDUSTRIAL APPLICABILITY

In the resin composition obtained by the present invention, enhancement in adhesion to the glass filler and improvement in rubber dispersibility in the aromatic polycarbonate-based matrix are compatible with each other though making them compatible has been heretofore difficult in such a matrix, and the molded body of the resin composition has excellent impact property and rigidity. Accordingly, the resin composition can be applied to materials of various fields including automotive members, appliance members, etc. where thinning of walls and dimensional stability are required.

The invention claimed is:

1. A resin composition comprising an engineering plastic (A), a glass filler (B), a rubber-containing graft polymer (C) and a salt (D) of an alkali metal and a strong acid, wherein
   a ratio of an acrylonitrile-derived component in a chloroform-soluble component of the resin composition is not more than 2.0 mass %,
   a content of a fatty acid in 100 parts by mass of the resin composition is not more than 0.03 parts by mass,
   a content of the salt (D) of an alkali metal and a strong acid in 100 parts by mass of the resin composition is 0.01 to 0.5 parts by mass, and
   in 100 parts by mass of a dry sample, a total content of calcium and magnesium, as measured by the following measuring method X, is not more than 0.0008 parts by mass, and a content of aluminum is not more than 0.0008 parts by mass, wherein
   a measuring method X comprising:
   1 preparation of dry sample wherein:
   a solution comprising 5 mass % of the resin composition and 95 mass % of chloroform is prepared, and the following operations (1) to (4) are carried out to obtain a "dry sample":
     (1) the solution is fed to a centrifugal separator and centrifuged at 5000 rpm for 30 minutes,
     (2) a supernatant liquid is extracted and placed in a flask,
     (3) the flask is set in a thermostatic chamber at a temperature of 68° C., and a volatile component is distilled off from the liquid using an evaporator, and
     (4) a residue in the flask is dried at a temperature of 120° C. for 3 hours to obtain a "dry sample",
   2 aluminum, magnesium and calcium in the dry sample are determined.

2. The resin composition according to claim 1, wherein the total content of calcium and magnesium is not more than 0.0006 parts by mass.

3. A resin composition comprising an engineering plastic (A), a glass filler (B), a rubber-containing graft polymer (C) and a salt (D) of an alkali metal and a strong acid, wherein
   an acetone-insoluble component content of the rubber-containing graft polymer (C) is not less than 25 mass %,
   a content of a fatty acid contained in the rubber-containing graft polymer (C) is not more than 1 mass %,
   per 100 parts by mass in total of the engineering plastic (A), the glass filler (B) and the rubber-containing graft polymer (C), a total content of salts of calcium or magnesium and strong acids in the resin composition is not more than 0.0008 parts by mass as a total content in terms of calcium and magnesium, and a content of a salt of aluminum and a strong acid is not more than 0.0008 parts by mass as a content in terms of aluminum, and
   a content of the salt (D) of an alkali metal and a strong acid in 100 parts by mass of the resin composition is 0.01 to 0.5 parts by mass.

4. The resin composition according to claim 3, wherein the total content in terms of calcium and magnesium is not more than 0.0006 parts by mass.

5. The resin composition according to claim 1, wherein the rubber-containing graft polymer (C) is one obtained by agglomerating a rubber-containing graft polymer latex by coagulation using a coagulant or spray-drying a latex, the rubber-containing graft polymer latex being obtained by emulsion polymerizing a vinyl monomer in the presence of a rubber latex containing a salt (D) of an alkali metal and a strong acid.

6. The resin composition according to claim 1, wherein the rubber-containing graft polymer (C) is one obtained by spray-drying latex.

7. The resin composition according to claim 1, wherein the resin composition further comprises salts of calcium or magnesium and weak acids derived from a component other than the glass filler (B) in a total amount of 0.0010 to 0.0060 parts by mass in terms of calcium and magnesium, per 100 parts by mass in total of the engineering plastic (A), the glass filler (B) and the rubber-containing graft polymer (C).

8. The resin composition according to claim 1, wherein a mass-average particle diameter of a rubber-like polymer in the rubber-containing graft polymer (C) is not more than 300 nm.

9. The resin composition according to claim 1, wherein the engineering plastic (A) is an aromatic polycarbonate resin.

10. The resin composition according to claim 5, wherein the salt (D) of an alkali metal and a strong acid is a salt of sodium or potassium and a sulfonic acid.

11. The resin composition according to claim 1, wherein a content of the rubber-containing graft polymer (C) is 0.25 to 15 mass % in 100 mass % in total of the engineering plastic (A), the glass filler (B) and the rubber-containing graft polymer (C).

12. The resin composition according to claim 1, wherein a content of the rubber-containing graft polymer (C) is 0.25 to 7.5 mass % in 100 mass % in total of the engineering plastic (A), the glass filler (B) and the rubber-containing graft polymer (C).

13. The resin composition according to claim 1, wherein a content of the glass filler (B) is 5 to 40 mass % in 100 mass % in total of the engineering plastic (A), the glass filler (B) and the rubber-containing graft polymer (C).

14. The resin composition according to claim 1, wherein the rubber-containing graft polymer (C) comprises one or more rubbers selected from butadiene rubber, styrene-butadiene copolymer rubber and silicone-acrylic composite rubber.

15. The resin composition according to claim 1, wherein the glass filler (B) is a glass fiber.

16. A molded body obtained by molding the resin composition according to claim 1.

17. A process for producing a resin composition, comprising mixing an engineering plastic (A), a glass filler (B) and a rubber-containing graft polymer (C) having an acetone-insoluble component content of not less than 25 mass % and a fatty acid content of not more than 1 mass %, wherein
   per 100 parts by mass in total of the engineering plastic (A), the glass filler (B) and the rubber-containing graft polymer (C), a total content of salts of calcium or magnesium and strong acids derived from the rubber-containing graft polymer (C) is not more than 0.0008 parts by mass as a total content in terms of calcium and magnesium, and a content of a salt of aluminum and a strong acid derived from the rubber-containing graft polymer (C) is not more than 0.0008 parts by mass as a content in terms of aluminum.

18. The resin composition according to claim 3, wherein the rubber-containing graft polymer (C) is one obtained by agglomerating a rubber-containing graft polymer latex by coagulation using a coagulant or spray-drying a latex, the rubber-containing graft polymer latex being obtained by emulsion polymerizing a vinyl monomer in the presence of a rubber latex containing a salt (D) of an alkali metal and a strong acid.

19. The resin composition according to claim 3, wherein the rubber-containing graft polymer (C) is one obtained by spray-drying latex.

20. The resin composition according to claim 3, wherein the resin composition further comprises salts of calcium or magnesium and weak acids derived from a component other than the glass filler (B) in a total amount of 0.0010 to 0.0060 parts by mass in terms of calcium and magnesium, per 100 parts by mass in total of the engineering plastic (A), the glass filler (B) and the rubber-containing graft polymer (C).

21. The resin composition according to claim 3, wherein a mass-average particle diameter of a rubber-like polymer in the rubber-containing graft polymer (C) is not more than 300 nm.

22. The resin composition according to claim 3, wherein the engineering plastic (A) is an aromatic polycarbonate resin.

23. The resin composition according to claim 3, wherein the salt (D) of an alkali metal and a strong acid is a salt of sodium or potassium and a sulfonic acid.

24. The resin composition according to claim 3, wherein a content of the rubber-containing graft polymer (C) is 0.25 to 15 mass % in 100 mass % in total of the engineering plastic (A), the glass filler (B) and the rubber-containing graft polymer (C).

25. The resin composition according to claim 3, wherein a content of the rubber-containing graft polymer (C) is 0.25 to 7.5 mass % in 100 mass % in total of the engineering plastic (A), the glass filler (B) and the rubber-containing graft polymer (C).

26. The resin composition according to claim 3, wherein a content of the glass filler (B) is 5 to 40 mass % in 100 mass % in total of the engineering plastic (A), the glass filler (B) and the rubber-containing graft polymer (C).

27. The resin composition according to claim 3, wherein the rubber-containing graft polymer (C) comprises one or more rubbers selected from butadiene rubber, styrene-butadiene copolymer rubber and silicone-acrylic composite rubber.

28. The resin composition according to claim 3, wherein the glass filler (B) is a glass fiber.

29. A molded body obtained by molding the resin composition according to claim 3.

30. The resin composition according to claim 1, wherein the content of aluminum is not more than 0.0002 parts by mass.

31. The resin composition according to claim 3, wherein the content of the salt of aluminum and the strong acid is not more than 0.0002 parts by mass in terms of aluminum.

32. The process for producing a resin composition according to claim 17, wherein the content of the salt of aluminum and the strong acid is not more than 0.0002 parts by mass in terms of aluminum.

* * * * *